US012754496B2

(12) United States Patent
Takahata

(10) Patent No.: US 12,754,496 B2
(45) Date of Patent: Oct. 6, 2026

(54) IMAGE FORMING APPARATUS

(71) Applicant: CANON KABUSHIKI KAISHA, Tokyo (JP)

(72) Inventor: Shusaku Takahata, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/082,914

(22) Filed: Mar. 18, 2025

(65) Prior Publication Data

US 2025/0298347 A1 Sep. 25, 2025

(30) Foreign Application Priority Data

Mar. 19, 2024 (JP) ................................. 2024-044264

(51) Int. Cl.
*G03G 15/16* (2006.01)
*G03G 15/01* (2006.01)

(52) U.S. Cl.
CPC ..... *G03G 15/1695* (2013.01); *G03G 15/0131* (2013.01); *G03G 15/1605* (2013.01); *G03G 2215/00409* (2013.01); *G03G 2215/1666* (2013.01)

(58) Field of Classification Search
CPC ........... G03G 15/1695; G03G 15/0131; G03G 15/1605; G03G 2215/00409; G03G 2215/1666
See application file for complete search history.

(56) References Cited

U.S. PATENT DOCUMENTS

| | | | | |
|---|---|---|---|---|
| 2010/0143006 | A1* | 6/2010 | Yamada | G03G 15/0818 399/285 |
| 2012/0099907 | A1* | 4/2012 | Ideguchi | G03G 15/1605 399/315 |
| 2016/0195837 | A1* | 7/2016 | Matsuura | G03G 15/1675 399/66 |
| 2017/0160681 | A1* | 6/2017 | Hiroi | G03G 15/1675 |
| 2017/0212454 | A1* | 7/2017 | Miyamoto | G03G 15/1695 |
| 2019/0086827 | A1* | 3/2019 | Koide | G03G 9/08795 |
| 2021/0216031 | A1* | 7/2021 | Tanaka | G03G 15/6535 |
| 2024/0288801 | A1* | 8/2024 | Tanaka | G03G 15/161 |

FOREIGN PATENT DOCUMENTS

| | | | |
|---|---|---|---|
| JP | 5-297735 | A | 11/1993 |
| JP | 2003-337462 | A | 11/2003 |
| JP | 2004-117920 | A | 4/2004 |
| JP | 2013-171282 | A | 9/2013 |
| JP | 2024-027750 | A | 3/2024 |

* cited by examiner

*Primary Examiner* — David H Banh
(74) *Attorney, Agent, or Firm* — Venable LLP

(57) ABSTRACT

An image forming apparatus includes an image bearing member, a transfer member, a first applying portion for applying a transfer bias to the transfer member, a recording material charging member for electrically charging a toner image transfer surface to an opposite polarity to a normal charge polarity of toner, a second applying portion for applying a recording material charging bias to the recording material charging member, a detecting portion for detecting a current flowing through the transfer member and a voltage applied to the transfer member, and a controller for controlling the recording material charging bias on the basis of a detection result by the detecting portion when a charging region of the recording material charged by the recording material charging member passes through a transfer portion.

10 Claims, 10 Drawing Sheets

IMAGE FORMING APPARATUS

FIELD OF THE INVENTION AND RELATED ART

The present invention relates to an image forming apparatus, such as a copying machine, a printer, a facsimile machine, or a multi-function machine having a plurality of functions of these machines, of an electrophotographic type or an electrostatic recording type.

Conventionally, in the image forming apparatus such as the copying machine of the electrophotographic type, a toner image is electrostatically transferred from an image bearing member such as the photosensitive member or an intermediary transfer member onto a recording material such as paper. Transfer is performed in many cases by forming a transfer portion by contact of a transfer member such as a transfer roller with the image bearing member and then by applying a transfer bias to the transfer portion. When a transfer current supplied to the transfer portion by the transfer bias is insufficient, an image defect, such as "transfer void" or "poor density", by which the transfer is not sufficiently performed and thus a desired image density cannot be obtained occurs in some instances. Further, when the transfer current supplied to the transfer portion by the transfer bias is excessive, electrical discharge occurs in the transfer portion, and by the influence of the electric discharge, a polarity of an electric charge of toner is reversed or the like, so that an image defect such as "white void" such that the toner is not partially transferred occurs in some instances. For that reason, in order to form a high-quality image, it is required that an appropriate transfer bias is applied to the transfer portion.

In Japanese Laid-Open Patent Application (JP-A) 2004-117920, a setting of a voltage value of a transfer bias by acquiring a voltage-current characteristic under application of a test bias to a transfer portion in a state in which the recording material is absent in the transfer portion to acquire a voltage value at which a predetermined target current is obtained and then by adding, to this voltage value, a recording material part voltage depending on a kind of the recording material, is made has been disclosed.

Here, the kind of the recording material includes, for example, a kind varying depending on a difference in smoothness of a surface of the recording material, such as high-quality paper or coated paper, a kind varying depending on a difference in thickness of the recording material, such as thin paper or thick paper, and the like kind. The recording material part voltage can be acquired in advance depending on, for example, such a kind of the recording material.

However, depending on the specifications of the recording material, due to that an electric resistance of the recording material is high, there is a possibility that an absolute value of a voltage of a transfer bias for passing a transfer current necessary, for example, in a low-humidity environment exceeds a high-voltage capacitance and thus the image defect due to the insufficient transfer current occurs.

In JP-A 2013-171282, it is proposed that a surface of a recording material onto which a toner image is transferred is electrically charged to an opposite polarity to a normal charge polarity of toner in advance before the recording material reaches a secondary transfer portion.

Recently, for example, in a production machine or the like, there is a tendency that a kind of the recording material used for image formation increases. For example, in order to transfer appropriately the toner image onto the recording material high in electric resistance, such as synthetic paper (recording material comprising plastic as a main component) or ultra-thick paper (thick paper having a basis weight exceeding 250 gsm), there is a need to apply a transfer bias higher in absolute value of a voltage. In order to transfer appropriately the toner image onto such a recording material without lowering productivity (image forming speed), it is effective that insufficient transfer current is made up for by charging a surface of the recording material, onto which the toner image is transferred, to an opposite polarity to the normal charge polarity of the toner in advance.

However, the number of kinds of recording materials distributed is very large. In addition, an electric resistance of the recording material fluctuates depending on a time in which the recording material is put in an environment even when the environment (temperature, humidity) is the same. Due to these reasons or the like, there are cases where it is difficult to acquire an electric charge, necessary to be imparted to the recording material before the transfer, in advance with accuracy. Further, for example, in the case of a recording material high in electric resistance, even when there is a small change in electric resistance, the electric charge necessary to be imparted to the recording material before the transfer largely changes in some instances.

Further, due to that information of the kind of the recording material set by a user or the like and a kind (property) of the recording material actually used in image formation do not coincide with each other, it is assumed that the electric charge imparted to the recording material before the transfer becomes insufficient or excessive.

When the electric charge imparted to the recording material before the transfer becomes insufficient and thus the transfer current becomes insufficient, as described above, there is a possibility that the image defect such as the transfer void or the poor density occurs. Further, when the electric charge imparted to the recording material before the transfer becomes excessive and thus the transfer current becomes excessive, as described above, there is a possibility that the image defect such as the white void occurs.

SUMMARY OF THE INVENTION

A principal object of the present invention is to enable that depending on a recording material used in image formation, a surface of the recording material onto which a toner image is transferred is electrically charged appropriately to an opposite polarity to a normal charge polarity of toner before the recording material reaches a transfer portion.

This object is accomplished by an image forming apparatus according to the present invention.

According to an aspect of the present invention, there is provided an image forming apparatus comprising: an image bearing member configured to bear a toner image; a transfer member configured to transfer the toner image from the image bearing member onto a recording material in a transfer portion; a first applying portion configured to apply a transfer bias to the transfer member; a recording material charging member, provided upstream of the transfer portion with respect to a recording material conveying direction, configured to electrically charge a toner image transfer surface, which is a surface of the recording material conveyed toward the transfer portion where the toner image is transferred onto the surface, to an opposite polarity to a normal charge polarity of toner; a second applying portion configured to apply a recording material charging bias to the recording material charging member; a detecting portion configured to detect a current flowing through the transfer member or a voltage applied to the transfer member; and a controller configured to control the recording material charging bias on the basis of a detection result by the detecting portion when a charging region of the recording material charged by the recording material charging member passes through the transfer portion.

Further features of the present invention will become apparent from the following description of exemplary embodiments with reference to the attached drawings.

DESCRIPTION OF EMBODIMENTS

An image forming apparatus according to the present invention will be specifically described with reference to the drawings.

Embodiment 1

1. Constitution and Operation of Image Forming Apparatus

Figure 1:
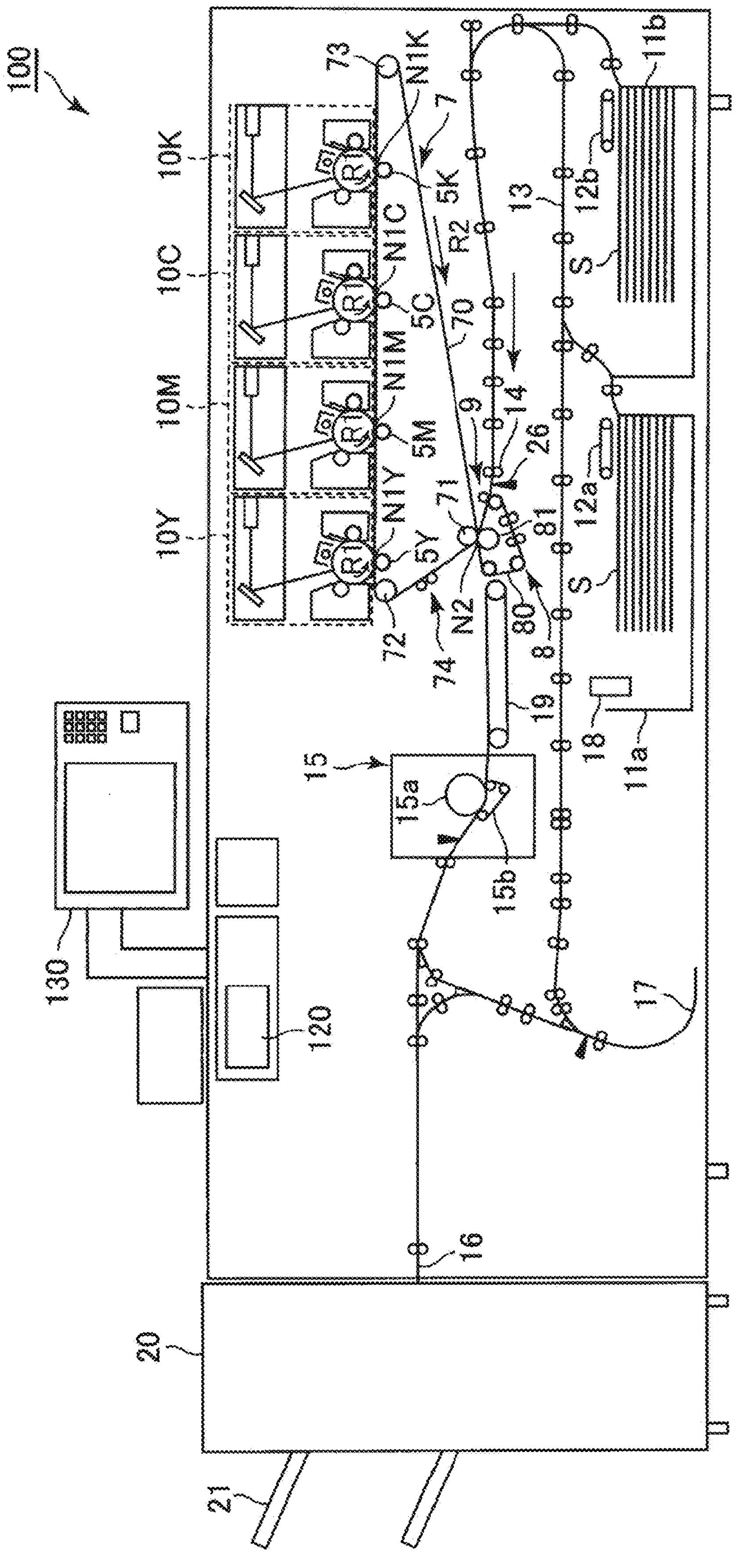
FIG. 1 is a schematic sectional view of an image forming apparatus.

FIG. 1 is a schematic sectional view of an image forming apparatus 100 of an embodiment 1. The image forming apparatus 100 in this embodiment is a tandem full-color printer which is capable of forming a full-color image with use of an electrophotographic type method and which employs an intermediary transfer type system. The image forming apparatus 100 is capable of forming and outputting an image on a sheet-like recording material on the basis of image information input from an external device such as a personal computer or image information input through an operating portion 130 provided for the image forming apparatus 100, or the like. Incidentally, in the image forming apparatus 100, paper is principally used as a recording material, and therefore, the recording material S is referred to as paper in some instances, but the recording material S is not limited to paper. As the recording material S, for example, it is also possible to use, for example, recording materials constituted by materials other than paper or materials containing the materials other than paper, such as a synthetic paper or a film constituted by a material principally comprising a synthetic resin, and special paper such as metallized paper having a metal layer, and the like.

Figure 2:
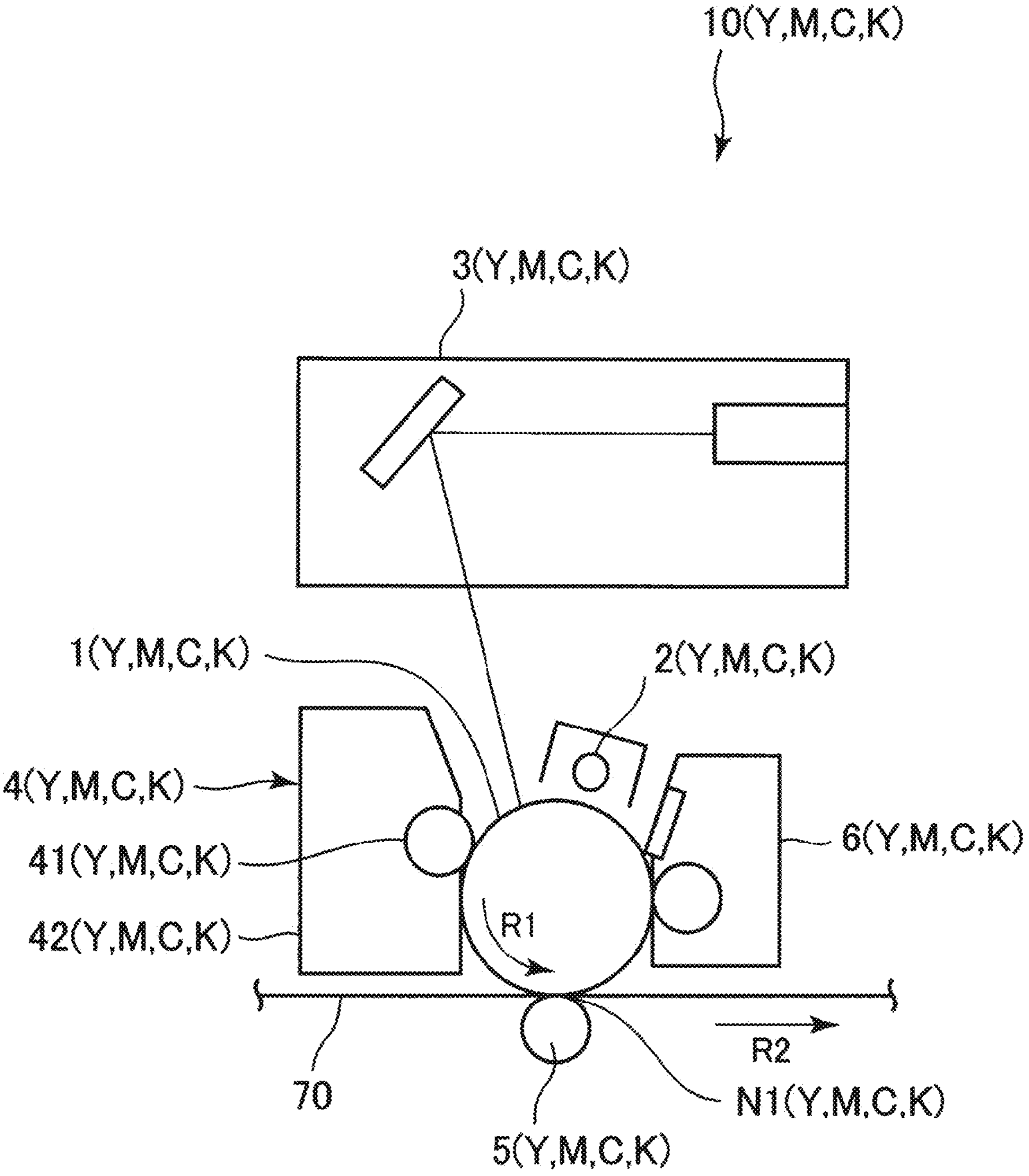
FIG. 2 is a schematic sectional view of an image forming portion.

The image forming apparatus 100 includes four image forming portions 10Y, 10M, 10C and 10K for forming color images of yellow (Y), magenta (M), cyan (C) and black (K). The respective image forming portions 10Y, 10M, 10C, and 10K are linearly arranged along a movement direction of an image transfer surface of an intermediary transfer belt 70 provided substantially horizontally as described later. Incidentally, as regards elements provided for respective colors, and having the same or corresponding functions or constitutions, suffixes Y, M, C and K for representing the elements for associated colors are omitted, and the elements will be collectively described in some instances. In this embodiment, the image forming portion 10 is constituted by including a photosensitive drum 1, a charging device 2, an exposure device 3, a developing device 4, a drum cleaning device 6, and the like, which are described later. FIG. 2 is a schematic sectional view of the image forming portion 10.

The photosensitive drum 1, which is a drum-type (cylindrical) photosensitive drum 1 as a first image bearing member, is movable (rotatable) while carrying an electrostatic image (electrostatic latent image). The photosensitive drum 1 includes an aluminum cylinder as a substrate and a surface layer (photosensitive layer) formed on a surface thereof. When an image forming operation is started, the photosensitive drum 1 is rotationally driven at a predetermined peripheral speed (process speed) in an arrow R1 direction (counterclockwise direction) by drum a driving motor D1 (FIG. 3) as a driving means. A surface of the rotating photosensitive drum 1 is electrically charged uniformly to a predetermined polarity (negative polarity in this embodiment) and a predetermined potential by the charging device 2 as a charging means. In this embodiment, the charging device 2 is a scorotron charger provided opposed to the photosensitive drum 1. During the charging, to a charging wire of the charging device 2, a predetermined charging bias (charging voltage) is applied by a charging power source E1 (FIG. 3) as a charging voltage applying means (charging voltage applying portion). By this, the charging device 2 causes electric discharge, and electrons generated by this discharge charge the surface of the photosensitive drum 1. The charged surface of the photosensitive drum 1 is subjected to scanning exposure to light on the basis of image information (image signal) by the exposure device 3 as an exposure means, so that an electrostatic image is formed on the photosensitive drum 1. In this embodiment, the exposure device 3 is a laser scanner. The exposure device 3 emits laser light in accordance with image information of separated color output from a controller 120 (FIG. 3), and subjects the surface (outer peripheral surface) of the photosensitive drum 1 to the scanning exposure.

The electrostatic image formed on the photosensitive drum 1 is developed (visualized) by being supplied with toner as a developer by the developing device 4 as a developing means, so that a toner image (toner picture, developer image) is formed on the photosensitive drum 1. In this embodiment, the developing device 4 develops the electrostatic image with a two-component developer, as a developer, provided with non-magnetic toner particles (toner) and magnetic carrier particles (carrier). The developing device 4 includes a developing sleeve 41 as a developer carrying member (developing member) and a developing container 42 for accommodating the developer. The developing sleeve 41 carries the developer in the developing container 42 and then conveys the developer toward a developing region opposing the photosensitive drum 1. During the development, to the developing sleeve 41, a predetermined developing bias (developing voltage) is applied by a developing power source E2 (FIG. 3) as a developing voltage applying means (developing voltage applying portion). In this embodiment, the toner charged to the same polarity as a charge polarity (negative polarity in this embodiment) of the photosensitive drum 1 is deposited on an exposed portion (image portion) of the photosensitive drum 1 where an absolute value of the potential is lowered by exposing the surface of the photosensitive drum 1 to light after the photosensitive drum 1 is uniformly charged (reverse development type). In this embodiment, a normal charge polarity of toner which is a principal charge polarity of the toner during the development is a negative polarity.

An intermediary transfer unit 7 is provided so as to oppose the four photosensitive drums 1Y, 1M, 1C, and 1K. The intermediary transfer unit 7 is constituted by including the intermediary transfer belt 70, an inner secondary transfer roller 71, a driving roller 72, a tension roller 73, primary transfer rollers 5Y, 5M, 5C, and 5K, and the like. The intermediary transfer belt 70, which is an intermediary transfer member constituted by an endless belt as a second image bearing member, is movable (rotatable) while carrying a toner image. The intermediary transfer belt 70 is extended around and stretched at a predetermined tension by, as a plurality of stretching rollers (supporting rollers), the inner secondary transfer roller 71, the driving roller 72, and the tension roller 73. The driving roller 72 is rotationally driven by an intermediary transfer belt driving motor D2 (FIG. 3) as a driving means. To the intermediary transfer belt 70, a driving force is transmitted by the driving roller 72, and the intermediary transfer belt 70 is rotated (circumferential movement) in an arrow R2 direction (counterclockwise direction) in FIG. 1 at a predetermined peripheral speed (process speed) corresponding to the peripheral speed of the photosensitive drum 1. The tension roller 73 imparts a predetermined tension to the intermediary transfer belt 70. The inner secondary transfer roller 71 forms a secondary transfer portion N2 in cooperation with an outer secondary transfer roller 81 (described later). On the inner peripheral surface side of the intermediary transfer belt 70, the primary transfer rollers 5Y, 5M, 5C, and 5K, which are roller-type primary transfer members as primary transfer means, are disposed correspondingly to the respective photosensitive drums 1Y, 1M, 1C, and 1K. The primary transfer roller 5 presses the intermediary transfer belt 70 toward an associated photosensitive drum 1, whereby a primary transfer portion (primary transfer nip) N1 where the photosensitive drum 1 and the intermediary transfer belt 70 contact each other is formed. The stretching rollers, for the intermediary transfer belt 70, other than the driving roller 72, and the respective primary transfer rollers 5 are rotated with rotation of the intermediary transfer belt 70.

The toner image formed on the photosensitive drum 1 is transferred (primarily-transferred) onto the rotating intermediary transfer belt 7 as a toner image receiving member in the primary transfer portion N1 by the action of the primary transfer roller 5. During the primary transfer, to the primary transfer roller 5, a primary transfer bias (primary transfer voltage) which is a DC voltage of an opposite polarity (positive polarity in this embodiment) to the normal charge polarity of the toner is applied by a primary transfer power source E3 (FIG. 3) as a primary transfer voltage applying means (primary transfer voltage applying portion). To the primary transfer roller 5, the primary transfer bias of the positive polarity is applied, whereby the toner image formed of the toner of the negative polarity on the photosensitive drum 1 is transferred onto the intermediary transfer belt 70. For example, during full-color image formation, the color toner images of yellow, magenta, cyan, and black formed on the respective photosensitive drums 1 are successively transferred superposedly onto the intermediary transfer belt 70, so that a multiple toner image is formed on the intermediary transfer belt 70.

Here, in this embodiment, the primary transfer roller 5 includes a core metal and an elastic layer formed with an ion-conductive foamed rubber (NBR rubber (nitrile rubber)) and ECO rubber (epichlorohydrin rubber) so as to coat an outer periphery of the core metal. An outer diameter of the primary transfer roller 5 is, for example, 15-20 mm. Incidentally, herein, as regards numerical value ranges, "-" means that numerical values before and after "-" are included in the associated numerical value range. Further, as the primary transfer roller 5, a roller having an electric resistance value of $1\times10^5$-$1\times10^8$ Ω measured in N/N (23 °C/50% RH) environment under application of a voltage of 2 kV may suitably be used.

Further, in this embodiment, the intermediary transfer belt 70 is constituted by an endless belt having a three-layer structure of a base layer, an elastic layer, and a surface layer from the inner peripheral surface side. As a material constituting the base layer, it is possible to suitably use a material obtained by incorporating carbon black or the like in an appropriate amount into a resin such as polyimide or polycarbonate or into various rubbers or the like. A thickness of the base layer is, for example, 0.05-0.15 mm. As a material constituting the elastic layer, it is possible to cite natural rubber, styrene-butadiene rubber, butadiene rubber, isoprene rubber, nitrile rubber, chloroprene rubber, butyl rubber, ethylene-propylene rubber, chlorosulfonated rubber, acrylate rubber, epichlorohydrin rubber, methane rubber, silicone rubber, fluorocarbon rubber, and the like. In this embodiment, urethane rubber was used. A thickness of the elastic layer may preferably be 100-2000 μm, more preferably 200-800 μm, in order to improve a transfer property of a toner image onto, for example, a recording material S having unevenness by sufficiently utilizing flexibility thereof. As a material constituting the surface layer, a resin such as fluorocarbon resin can be suitably used. The surface layer decreases a depositing force of the toner onto the surface of the intermediary transfer belt 70, and thus makes the toner easy to be transferred onto the recording material S in the secondary transfer portion N2. A thickness of the surface layer is, for example, 0.0002-0.020 mm. Further, as a base material of the surface layer, it is possible to use, for example, a resin material of a single kind, such as polyurethane, polyester, or epoxy resin, or materials of two or more kinds selected from elastic materials such as elastomers including elastic rubber, polyurethane, and the like. Further, to this base material, as a material for enhancing a lubricating property by reducing surface energy, it is possible to disperse powder or particles of, for example, fluorocarbon resin such as PTFE, PVDF, or PFA, silicone resin, and the like in a manner such that these materials are dispersed singly or in combination of two or more kinds or in the form of different particle sizes. By this, the surface layer can be formed. In this embodiment, the intermediary transfer belt 70 is $1\times10^8$-$1\times10^{14}$ Ω·cm (23 °C, 50% RH) in volume resistivity. Incidentally, the intermediary transfer belt 70 has the three-layer structure in this embodiment, but may also have, for example, a single-layer structure of a material corresponding to the above-described base layer, a two-layer structure consisting of the above-described base layer and the above-described surface layer, or the like layer structure.

On an outer peripheral surface side of the intermediary transfer belt 70, a secondary transfer unit 8 is provided so as to oppose the inner secondary transfer roller 71. The secondary transfer unit 8 includes a secondary transfer belt 80 constituted by an endless belt and an outer secondary transfer roller (secondary transfer roller) 81 provided in a position opposing the inner secondary transfer roller 71 on the inner peripheral surface side of the secondary transfer belt 80. The outer secondary transfer roller 81 is pressed toward the inner secondary transfer roller 71 and is contacted to the inner secondary transfer roller 71 through the secondary transfer belt 80 and the intermediary transfer belt 70. By this, the outer secondary transfer roller 81 forms the secondary transfer portion (secondary transfer nip) N2 which is a contact portion between the intermediary transfer belt 70 and the secondary transfer belt 80. Each of the inner secondary transfer roller 71 and the outer secondary transfer roller 81 is an example of a roller-type secondary transfer member as a secondary transfer means.

The toner image formed on the intermediary transfer belt 70 is transferred (secondarily transferred) in the secondary transfer portion N2 onto the recording material S nipped and conveyed by the intermediary transfer belt 70 and the secondary transfer belt 80. In this embodiment, during the secondary transfer, to the inner secondary transfer roller 71, a secondary transfer bias (secondary transfer voltage) which is a DC voltage of the same polarity (negative polarity in this embodiment) as the normal charge polarity of the toner is applied by a secondary transfer power source E4 as a secondary transfer voltage applying means (secondary transfer voltage applying portion). Further, in this embodiment, the outer secondary transfer roller 81 is connected to the ground (ground potential) (i.e., is electrically grounded). Details of the secondary transfer unit 8 will be described later.

The recording materials (transfer materials, recording media, sheets) S are accommodated in cassettes 11*a* and 11*b*. The recording material S is fed from either one of the cassettes 11*a* and 11*b* to a feeding/conveying path 13 as a recording material conveying path by a feeding member 12*a* or 12*b*, and then is conveyed toward a registration roller pair 14 as a conveying member. This recording material S is timed to the toner image on the intermediary transfer belt 70 by the registration roller pair 14 and then is conveyed toward the secondary transfer portion N2. The registration roller pair 14 is rotationally driven by transmitting thereto a driving force from a conveyance driving motor D4 (FIG. 3) as a driving means. Further, in this embodiment, a pre-charging device 9 for electrically charging a surface of the recording material S, onto which the toner image is transferred, before the recording material S reaches the secondary transfer portion N2, is provided upstream of the secondary transfer portion N2 (and downstream of the registration roller pair 14) with respect to a conveying direction of the recording material S. Details of the pre-charging device 9 will be described later.

The recording material S on which the toner image is transferred is conveyed to a fixing device 15 as a fixing means by a conveying belt 19 as a conveying member. The fixing device 15 includes a fixing roller 15*a* and a pressing belt unit 15*b*. The fixing roller 15*a* incorporates a heater as a heating means therein. The recording material S on which an unfixed toner image is carried is heated and pressed by being nipped and conveyed between the fixing roller 15*a* and the pressing belt unit 15*b*. By this, the toner image is fixed (fused, stuck) on the recording material S.

In the case of an operation in a one-side printing mode, the recording material S, on which the toner image is fixed on one side (surface) thereof as described above, passes through a discharge conveying path 16 as a recording material conveying path and then is discharged (output) onto a discharge tray 21 as a discharge portion through a post-processing portion 20. In the case of an operation in a double-side printing mode, the recording material S, on which the toner image is fixed on one side (surface) as described above, is conveyed to the secondary transfer portion N2 again in order to transfer the toner image onto a second side (surface) of the recording material S. That is, in the operation in the double-side printing mode, the recording material S, on which the toner image is fixed on the first side thereof, is sent toward a reverse conveying path 17 as a recording material conveying path and is subjected to a switch-back operation in the reverse conveying path 17, so that a leading end and a trailing end of the recording material S are replaced with each other, and then the recording material S is conveyed again to the feeding/conveying path 13. The recording material S conveyed to the feeding/conveying path 13 is conveyed to the registration roller pair 14 and then is conveyed again to the secondary transfer portion N2. Then, on this recording material S, similarly as described above, a toner image is transferred onto a second side (surface) and then is fixed, and thereafter, the recording material S is discharged onto the discharge tray 21.

Further, the toner (primary transfer residual toner) remaining on the photosensitive drum 1 after the primary transfer is removed and collected from the surface of the photosensitive drum 1 by the drum cleaning device 6 as a photosensitive member cleaning means. Further, deposited matter such as the toner (secondary transfer residual toner) remaining on the intermediary transfer belt 70 after the secondary transfer is removed and collected from the surface of the intermediary transfer belt 70 by a belt cleaning device 74 as an intermediary transfer member cleaning means.

2. Control Constitution

Figure 3:
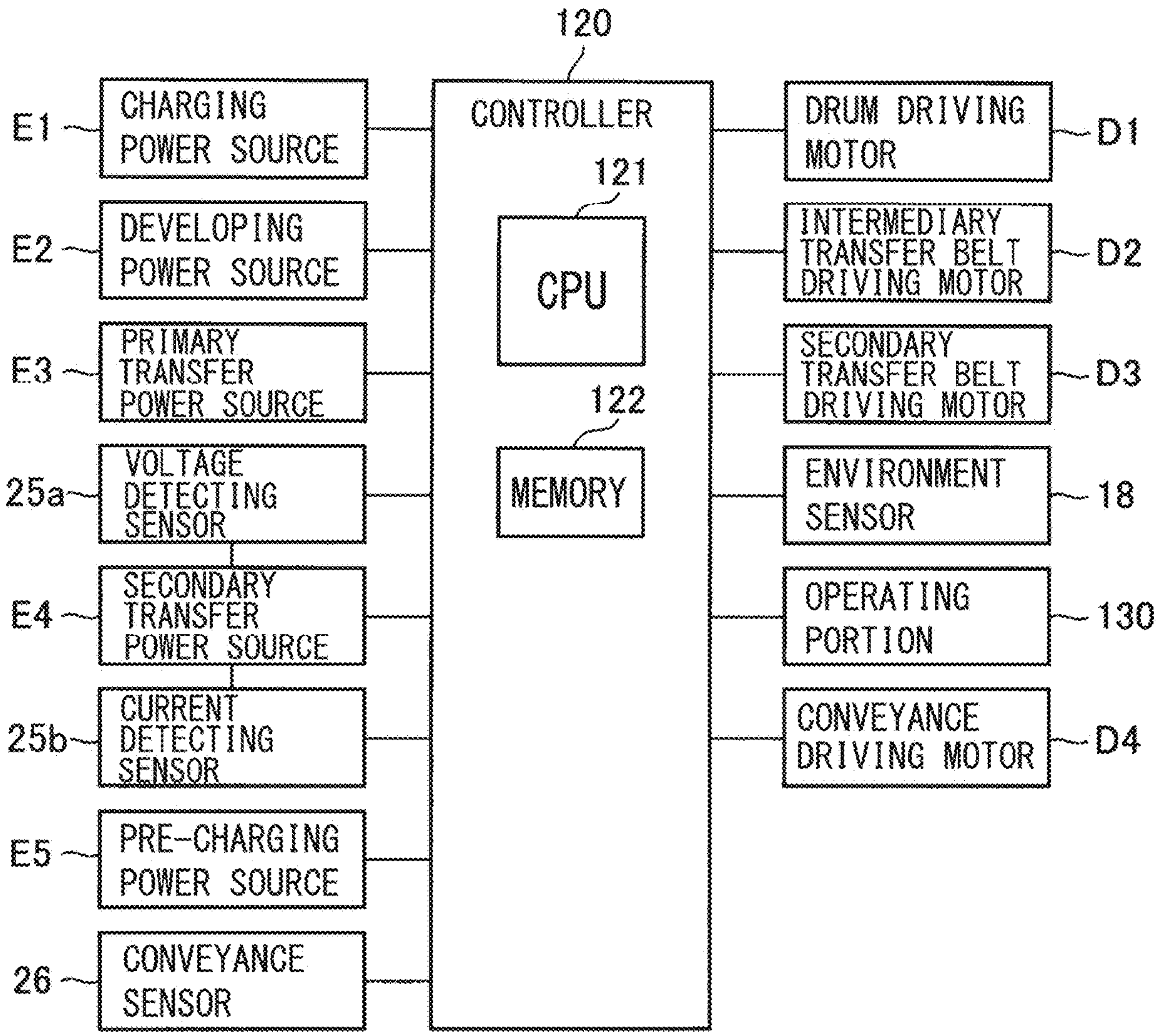
FIG. 3 is a block diagram showing an outline of a control constitution of the image forming apparatus.

FIG. 3 is a block diagram showing an outline of a control constitution of the image forming apparatus in this embodiment. The image forming apparatus 100 includes a controller (control circuit) 120 for controlling the image forming apparatus 100. The controller 120 is constituted by including a CPU 121 as arithmetic processing means (arithmetic processing portion), a memory (storing medium) 122 such as a ROM or a RAM as a storing means (storing portion), and an input/output portion (not shown) for performing input/output of information between the controller 120 and an external device. The CPU 121 and the memory 122 are capable of transferring and reading of data therebetween.

In the ROM, a control program, a data table acquired in advance, and the like are stored. In the RAM, which is a rewritable memory, information input to the controller 120, detected information, a calculation result, and the like are stored.

To the controller 120, the respective portions of the image forming apparatus 100 are connected. The controller 120 controls the respective portions of the image forming apparatus 100 and causes the image forming apparatus 100 to execute various operations such as the image forming operation.

For example, to the controller 120, various power sources, such as the charging power source E1, the developing power source E2, the primary transfer power source E3, the secondary transfer power source E4, and the pre-charging power source E5, are connected. Further, to the controller 120, various driving portions, such as the drum driving motor D1, the intermediary transfer belt driving motor D2, and a secondary transfer belt driving motor D3 (described later), are connected.

Further, to the controller 120, an environment sensor 18 is connected. The environment sensor 18 is an example of an environment detecting means for detecting an environment (installation environment of the image forming apparatus 100) which is at least one of a temperature and a humidity inside or outside the image forming apparatus 100. In this embodiment, the environment sensor 18 is constituted by a temperature/humidity sensor for detecting a temperature and a humidity (relative humidity) inside the image forming apparatus 100 (inside the cassettes 11*a* and 11*b* or in the neighborhood of the cassettes 11*a* and 11*b*). The environment sensor 18 inputs, to the controller 120, signals showing detection results of the temperature and the humidity. On the basis of the temperature and the humidity detected by the environment sensor 18, the controller 120 calculates an absolute water content (absolute humidity) as temperature/humidity information in an environment, and can use the calculated absolute water content in the control. Even when an atmospheric environment abruptly changes, an electric resistance value of the recording material S is not abruptly changed in many cases. For that reason, by providing the environment sensor 18 inside the cassettes 11*a* and 11*b* or in the neighborhood of the cassettes 11*a* and 11*b*, a change in electric resistance of the recording material S can be grasped more accurately.

To the secondary transfer power source E4, a voltage detecting sensor 25*a* as a voltage detecting means (voltage detecting portion) for detecting an output voltage thereof and a current detecting sensor 25*b* as a current detecting means (current detecting portion) for detecting an output current thereof are connected. The voltage detecting sensor 25*a* is capable of detecting a voltage applied to the inner secondary transfer roller 71 (secondary transfer portion N2). The current detecting sensor 25*b* is capable of detecting a current flowing through the inner secondary transfer roller 71 (secondary transfer portion N2). The voltage detecting sensor 25*a* and the current detecting sensor 25*b* input signals indicating detection results of the voltage and the current, respectively, to the controller 120. The controller 120 is capable of executing secondary transfer voltage determination control (described later) or the like on the basis of the detection results of the voltage detecting sensor 25*a* and the current detecting sensor 25*b*. Further, the controller 120 is capable of executing pre-charging bias adjustment control (described later) or the like on the basis of the detection result of the current detecting sensor 25*b*.

Further, the image forming apparatus 100 includes a conveyance sensor 26 as a recording material detecting means for controlling a conveying timing of the recording material S to the secondary transfer portion N2 or an image forming timing.

The conveyance sensor 26 is provided, for example, adjacently to a side downstream of the registration roller pair 14 with respect to the conveying direction of the recording material S. The conveyance sensor 26 is capable of detecting at least one of arrival of a leading end of the recording material S with respect to the recording material conveying direction and passing of a trailing end of the recording material S with respect to the recording material conveying direction. The conveyance sensor 26 inputs a signal indicating a detection result of the recording material S to the controller 120. On the basis of the detection result by the conveyance sensor 26, the controller 120 is capable of executing control of drive of the registration roller pair 14 by the conveyance driving motor D4 and control of a current detection timing in the pre-charging bias adjustment control (described later).

Further, to the controller 120, an operating portion (operating panel) 130 provided for the image forming apparatus 100 is connected. The operating portion 130 is constituted by including a display portion for displaying various pieces of information to an operator such as a user or a service person by control by the controller 120, and an input portion for inputting, to the controller 120, various settings relating to image formation and the like by the operator. The operating portion 130 may be constituted by a touch panel or the like having functions of the display portion and the input portion. Further, to the controller 102, an image reading apparatus (not shown) and an external device such as a personal computer, which are provided in the image forming apparatus 100 or connected to the image forming apparatus may be connected.

Incidentally, in this embodiment, although illustration is omitted, the charging power source E1, the developing power source E2, and the primary transfer power source E3 are provided independently of each other. Further, the drum driving motor D1 may be provided independently of the photosensitive drum 1, or may be provided in common to all or a part of the photosensitive drums 1. Further, all or a part of the drum driving motor D1, the intermediary transfer belt driving motor D2, the secondary transfer belt driving motor D3, and the conveyance driving motor D4 may be made common.

The image forming apparatus 100 executes a job (print job), which is a series of operations started by a single start instruction and in which the image is formed and output on a single recording material S or a plurality of recording materials S. The job includes an image forming step, a pre-rotation step, a sheet (paper) interval step, and a post-rotation step in general. The image forming step is a period in which formation of an electrostatic image for the image actually formed and output on the recording material S (exposure), formation of the toner image (development), and transfer of the toner image are carried out, and during image formation refers to this period. Specifically, timings during the image formation are different among positions where the respective steps of the formation of the electrostatic image, the formation of the toner image, and the transfer of the toner image and the fixing are performed. The pre-rotation step is a period in which a preparatory operation, before the image forming step, from an input of the start instruction until the image is started to be actually formed, is performed. The sheet interval step is a period corresponding to an interval between a recording material S and a subsequent recording material S when the images are continuously formed on a plurality of recording materials S (continuous image formation). The post-rotation step is a period in which a post-operation (preparatory operation) after the image forming step is performed. During non-image formation is a period other than during image formation and includes the pre-rotation step, the sheet interval step, the post-rotation step and further includes a pre-multi-rotation step which is a preparatory operation during turning-on of a main switch (power source) of the image forming apparatus 100 or during restoration from a sleep state.

3. Secondary Transfer Unit

Next, the secondary transfer unit (secondary transfer device) 8 in this embodiment will be described.

Figure 4:
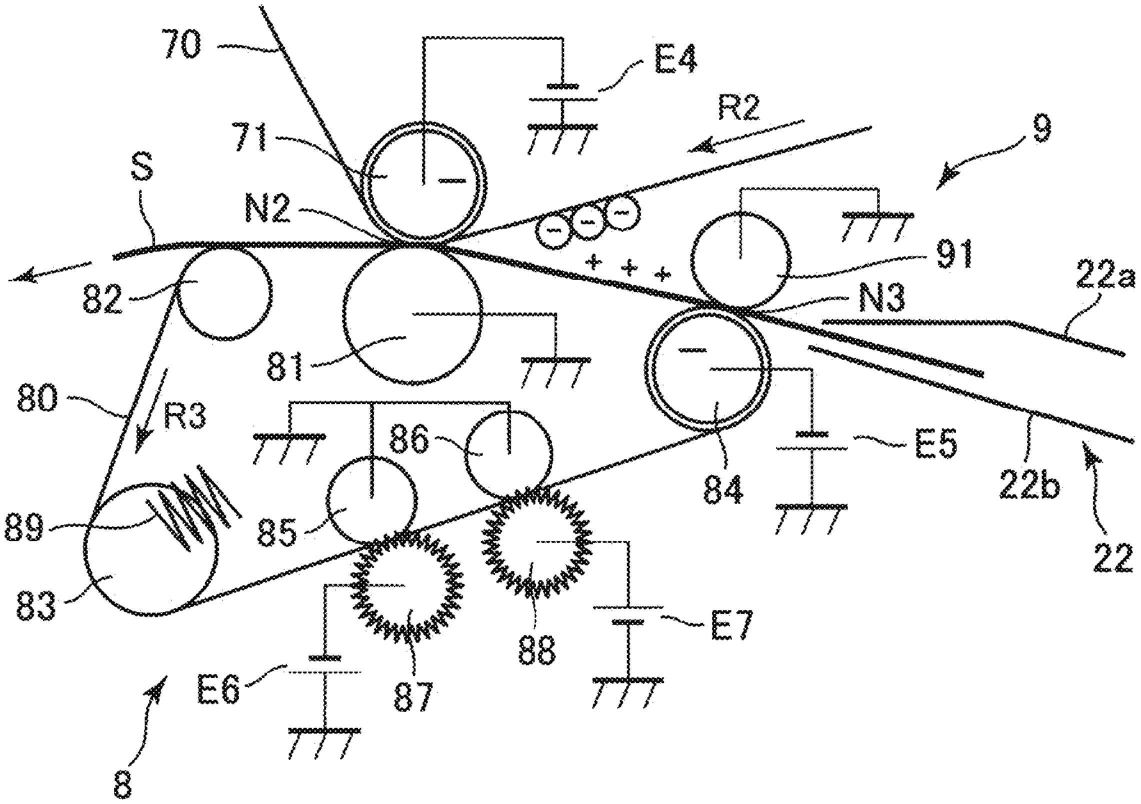
FIG. 4 is a schematic sectional view showing a structure of a neighborhood of a secondary transfer portion.

FIG. 4 is a schematic sectional view (showing a cross section substantially perpendicular to a rotational axis direction of the photosensitive drum 1 or rotational axis directions of the stretching rollers for the secondary transfer belt 80) showing the neighborhood of the secondary transfer portion N2 in this embodiment. Incidentally, as regards the secondary transfer belt 80 and the stretching rollers for the secondary transfer belt 80, "upstream" and "downstream"

refer to "upstream" and "downstream", respectively, with respect to a rotational direction (surface movement direction) of the secondary transfer belt 80.

The secondary transfer unit 8 includes the secondary transfer belt 80 constituted by an endless belt as a recording material carrying member. The secondary transfer belt 80 is extended around and stretched at a predetermined tension by a plurality of stretching rollers (supporting rollers). In this embodiment, the secondary transfer unit 8 includes, as the stretching rollers provided on the inner peripheral surface side of the secondary transfer belt 80, an outer secondary transfer roller 81, a separation roller 82, a tension roller 83, and a driving roller (secondary transfer belt driving roller) 84. Further, in this embodiment, the secondary transfer unit 8 includes first and second cleaning opposite rollers 85 and 86 as stretching rollers provided on the inner peripheral surface side of the secondary transfer belt 80. Rotational axis directions of the outer secondary transfer roller 81, the separation roller 82, the tension roller 83, the driving roller 84, and the first and second cleaning opposite rollers 85 and 86 are substantially parallel to each other. Further, these rotational axis directions of the stretching rollers for the secondary transfer belt 80 are substantially parallel to the rotational axis direction of the photosensitive drum 1 and the rotational axis directions of the stretching rollers for the intermediary transfer belt 70.

The secondary transfer belt 80 can be constituted by an endless belt member having a layer formed of a resin material or a metal material. For example, the secondary transfer belt 80 is formed of the resin material adjusted in volume resistivity to $1\times10^{9}$-$1\times10^{14}$ Ω·cm (23 °C, 50% RH) by incorporating carbon black as an antistatic agent in an appropriate amount into a resin such as polyimide, polycarbonate, or the like. The secondary transfer belt 80 may have a single-layer structure or a multi-layer structure. A thickness of the secondary transfer belt 80 is about 0.07-0.1 mm, for example. Further, a peripheral length of the secondary transfer belt 80 is about 300 mm, for example.

The outer secondary transfer roller 81 is disposed opposed to the inner secondary transfer roller 71 through the secondary transfer belt 80 and the intermediary transfer belt 70. The outer secondary transfer roller 81 is pressed toward the inner secondary transfer roller 71 by a pressing mechanism (not shown). The outer secondary transfer roller 81 is contacted to the inner secondary transfer roller 71 through the secondary transfer belt 80 and the intermediary transfer belt 70. By this, the secondary transfer belt 80 and the intermediary transfer belt 70 are sandwiched by the outer secondary transfer roller 81 and the inner secondary transfer roller 71, so that the secondary transfer portion N2 which is a contact portion between the intermediary transfer belt 70 and the secondary transfer belt 80 is formed. In this embodiment, the outer secondary transfer roller 81 includes a core metal and an elastic layer formed with ion-conductive foamed rubber (NBR rubber and ECO rubber) so as to coat an outer periphery of the core metal. An outer diameter of the outer secondary transfer roller 81 is, for example, 15-35 mm. By this, a sufficient nip (secondary transfer portion) N2 can be formed as the secondary transfer portion N2. Further, as the outer secondary transfer roller 81, it is possible to suitably use a roller having an electric resistance value of $1\times10^{7}$-$1\times10^{8}$ Ω (as measured in N/N (23 °C/50% RH) environment under application of a voltage of 2 kV). In the contact portion between the inner secondary transfer roller 71 and the outer secondary transfer roller 81 through the intermediary transfer belt 70 and the secondary transfer belt 80, by a contact force thereof, the elastic layer of the outer secondary transfer roller 81 lower in hardness than the inner secondary transfer roller 71 is elastically deformed.

The separation roller 82 is disposed adjacently to (immediately downstream of) the outer secondary transfer roller 81 on a side downstream of the outer secondary transfer roller 81. By the separation roller 82 and the outer secondary transfer roller 81, a recording material carrying surface (conveying surface) which is an outer peripheral surface of the secondary transfer belt 80 for carrying and conveying the recording material S is formed. The recording material S passed through the secondary transfer portion N2 and electrostatically attracted to the recording material carrying surface of the secondary transfer belt 80 is conveyed by the secondary transfer belt 80, and thereafter, is peeled off from the secondary transfer belt 80 by utilizing curvature. By this, the recording material S is delivered from the secondary transfer belt 80 to the conveying belt 19. In this embodiment, the separation roller 82 is constituted by a metal roller.

The tension roller (secondary transfer belt tension roller) 83 is disposed adjacently to (immediately downstream of) the separation roller 82 on a side downstream of the separation roller 82. The tension roller 83 is pressed from the inner peripheral surface side toward the outer peripheral surface side of the secondary transfer belt 80 by a pressing spring 89 which is an urging member as an urging means, and thus imparts a predetermined tension to the secondary transfer belt 80. In this embodiment, the tension roller 83 is constituted by a metal roller.

The driving roller (secondary transfer belt driving roller) 84 is disposed adjacently to (immediately upstream of) the outer secondary transfer roller 81. By the outer secondary transfer roller 81 and the driving roller 84, a recording material carrying surface (conveying surface), which is an outer peripheral surface of the secondary transfer belt 80 for carrying and conveying the recording material S, is formed. In this embodiment, the driving roller 84 includes a core metal, and an elastic layer formed with EPDM rubber (ethylene-propylene(-diene-methylene)rubber) sufficiently low in electric resistance so as to coat an outer periphery of the core metal. By this, electrical conduction between the driving roller 84 and a pre-charging opposite roller 91 (described later) is established. In this embodiment, an outer diameter of the core metal of the driving roller 84 is 20 mm. Further, in this embodiment, a thickness of the EPDM rubber constituting the elastic layer of the driving roller 84 is 0.5 mm, and a surface thereof is polished and managed so that a surface roughness is substantially constant. The driving roller 84 is rotationally driven by the secondary transfer belt driving motor D3 (FIG. 3) as a driving means. To the secondary transfer belt 80, a driving force is transmitted by the driving roller 84, so that the secondary transfer belt 80 is rotated (circumferential movement) at a predetermined peripheral speed corresponding to the peripheral speed of the intermediary transfer belt 70 in an arrow R3 direction (counterclockwise direction) in FIG. 4. The stretching rollers, for the secondary transfer belt 80, other than the driving roller 84 are rotated with rotation of the secondary transfer belt 80. Incidentally, a roller to which the driving means for conveying the secondary transfer belt 80 is connected, is not limited to the driving roller 84 in this embodiment, but may only be required to be either one of rollers contacting the inner peripheral surface of the secondary transfer belt 80. Further, the secondary transfer unit 8 may also be constituted so that the secondary transfer belt 80 is rotated with rotation of the intermediary transfer belt 70.

The first and second cleaning opposite rollers 85 and 86 are disposed on a side downstream of the tension roller 83 and upstream of the driving roller 84, and the first cleaning opposite roller 85 is disposed upstream of the second cleaning opposite roller 86. Further, the secondary transfer unit 8 includes first and second brush rollers 87 and 88 as first and second secondary transfer belt cleaning members in positions opposing the first and second cleaning opposite rollers 85 and 86, respectively, on the outer peripheral surface side of the secondary transfer belt 80. To the first brush roller 87, a cleaning bias (cleaning voltage) of the same polarity (negative polarity in this embodiment) as the normal charge polarity is applied from a first cleaning power source E6. Further, to the second brush roller 88, a cleaning bias (cleaning voltage) of an opposite polarity (positive polarity in this embodiment) to the normal charge polarity is applied from a second cleaning power source E7. Each of the first and second cleaning opposite rollers 85 and 86 is electrically grounded. By this, deposited matter, such as toner of the opposite polarity to the normal charge polarity of the toner deposited on the surface of the secondary transfer belt 80, or the like is collected by the first brush roller 87. Further, deposited matter such as toner of the same polarity as the normal charge polarity of the toner deposited on the surface of the secondary transfer belt 80, or the like, is collected by the second brush roller 88. The deposited matter collected by the first and second brush rollers 87 and 88 is removed from the first and second brush rollers 87 and 88 by a collecting member (not shown) or the like, and is accommodated in the collecting member (not shown) or the like. Thus, the surface of the secondary transfer belt 80 can be electrostatically cleaned.

In this embodiment, to the core metal of the inner secondary transfer roller 71, the secondary transfer power source E4 is connected. Further, to the inner secondary transfer roller 71, the secondary transfer bias of the same polarity (negative polarity in this embodiment) as the normal charge polarity of the toner is applied by the secondary transfer power source E4. Further, in this embodiment, the core metal of the outer secondary transfer roller 81 is connected to the ground, so that the outer secondary transfer roller 81 is electrically grounded. Here, such an energizing type that the secondary transfer bias is applied from a side where the toner image is transferred onto the surface of the recording material S is referred to as an "inner energization type". On the other hand, such an energization type that the secondary transfer bias is applied from a side opposite from the side where the toner image is transferred onto the recording material S is referred to as an "outer energization type". In the case of the outer energization type, for example, the inner secondary transfer roller 71 is electrically grounded, and to the outer secondary transfer roller 81, the secondary transfer bias of the opposite polarity to the normal charge polarity of the toner is applied.

The inner energization type is improved compared with the outer energization type in a transfer property of the toner image onto a recording material S (low-resistance recording material) low in electric resistance, such as metallic foil paper. This is due to the following reason. In the outer energization type, in the case where the electric resistance of the recording material S is low and leakage of a transfer current to a member or the like in the neighborhood of the secondary transfer portion N2 through the recording material S occurs, the transfer current escapes to the above-described member without contributing to the transfer between the recording material S and the intermediary transfer belt 70. On the other hand, in the inner energization type, even in the case where the electric resistance of the recording material S is low and leakage of the transfer current to the member or the like in the neighborhood of the secondary transfer portion N2 through the recording material S occurs, the transfer current escapes to the above-described member after the transfer current contributes to the transfer between the recording material S and the intermediary transfer belt 70. For that reason, the inner energization type is improved compared with the outer energization type in transfer property of the toner image to the recording material S low in electric resistance.

In this embodiment, the secondary transfer bias is applied by constant-voltage control. A voltage value (target voltage) of the secondary transfer bias is determined to be a voltage value which is the sum of a base voltage Vb for obtaining a predetermined transfer current and a recording material part voltage Vp determined depending on a kind of the recording material S. The recording material part voltage Vp is set in advance depending on the kind of the recording material S and depending on an environment (for example, an absolute water content), and then is stored as table data or the like in the memory 122.

The base voltage Vb can be obtained, for example, on the basis of a detection result of a current or a voltage when a single or a plurality of values of test biases (test currents or test voltages) are applied to the secondary transfer portion N2 in a state in which the toner image and the recording material S are absent in the secondary transfer portion N2. For example, in a state in which the toner image and the recording material S are absent in the secondary transfer portion N2, a test bias is applied to the secondary transfer portion N2 (inner secondary transfer roller 71) through the constant-current control so that a current detected by the current detecting sensor 25*b* becomes a target current corresponding to the predetermined transfer current. Further, on the basis of a detection result of the voltage generated at that time by the voltage detecting sensor 25*a*, the base voltage Vb can be acquired. Or, in a state in which the toner image and the recording material S are absent in the secondary transfer portion N2, a plurality of test biases are applied to the secondary transfer portion N2 (inner secondary transfer roller 71) through the constant-current control or the constant-voltage control. Further, on the basis of a detection result of the voltage generated at that time by the voltage detecting sensor 25*a* or the current flowing at that time by the current detecting sensor 25*b*, a voltage-current characteristic (rectilinear line or curved line) can be acquired. Further, on the basis of the voltage-current characteristic, the base voltage Vb, at which the predetermined transfer current can be obtained, can be acquired. The predetermined transfer current is set in advance depending on, for example, the environment (such as the absolute water content) and is stored as table data in the memory 122. Such control is called secondary transfer voltage determination control or ATVC (Active Transfer Voltage Control). By this, the secondary transfer bias can be changed depending on the electric resistance of the secondary transfer portion N2, which is sequentially changed by a change in environment or a use status (cumulative use amount) of a member relating to the secondary transfer. The member relating to the secondary transfer is the inner secondary transfer roller 71, the outer secondary transfer roller 81, the intermediary transfer belt 70, the secondary transfer belt 80, or the like. The secondary transfer voltage determination control is executed by control by the controller 120. The secondary transfer voltage determination control is typically executed for every job in the pre-rotation step or the pre-multi-rotation step, but may be executed at an arbitrary timing (sheet interval step or the like) when the timing is during non-image formation such that the toner image and the recording material S are absent in the secondary transfer portion N2.

Here, the constant-current control is control in which an output of a power source is adjusted so that a current supplied to a supply object becomes substantially constant at the target current. Further, the constant-voltage control is control in which the output of the power source is adjusted so that a voltage applied to an application object becomes substantially constant at the target voltage. Further, the kind of the recording material S includes arbitrary information capable of discriminating the recording material S, inclusive of attributes (so-called paper kind category) based on general features such as plain paper, coated paper, thick paper, and synthetic paper; numerical values and numerical value ranges such as a basis weight and a thickness; brands (including manufacturers, product numbers, and the like); and so on. In general, the kind of the recording material S is identified by the paper kind category and the thickness (or the basis weight) in many cases.

4. Pre-Charging Device

Next, the pre-charging device (recording material charging device) 8 in this embodiment will be further described.

As described above, in the image forming apparatus, depending on the specifications of the recording material, there is a possibility that an image defect, such as a transfer void or poor density due to shortage of the transfer current, occurs. Recently, for example, in a production machine of an intermediary transfer type, there is a tendency that the kind of the recording material used in the image formation increases. For example, in the production machine high in image forming speed, there are cases where it is difficult to properly secondarily transfer the toner image onto a recording material (high-resistance recording material), without lowering productivity, such as ultra-thick paper (high-resistance paper) or synthetic paper high in electric resistance due to that the synthetic paper includes a resin layer.

For example, in a low-humidity environment, the electric resistance of the outer secondary transfer roller becomes high, and therefore, there is a need that an absolute value of a voltage of the secondary transfer bias for passing a necessary transfer current is made large. There are cases where the absolute value of the voltage of the secondary transfer bias is required to be made 10 kV or more. In such cases where the secondary transfer bias exceeds a high-voltage capacitance, there is a possibility that the transfer void or the poor density due to the shortage of the transfer current occurs. This transfer void or the poor density occurs, for example, in a secondary-color toner image. Further, a high-voltage power source capable of applying such a secondary transfer bias is expensive, so that there is a possibility that the high-voltage source becomes a factor of an increase in cost of the image forming apparatus. Further, even when such a high-voltage source is intended to be used, due to convenience of arrangement, a creepage surface cannot be ensured in some cases, so that the secondary transfer bias large in absolute value of the voltage as described above cannot be applied in some cases. Further, when the absolute value of the voltage of the secondary transfer bias is made large, an image defect due to an electric discharge phenomenon in the secondary transfer portion occurs, so that it is difficult to obtain an appropriate image in some cases. As the image defect due to the discharge phenomenon, a stripe-shaped image defect and an image defect called a white void or penetration, which are caused due to that a part of the toner image is not transferred or that a part of the toner image is disturbed (scattered) occur in some instances.

Thus, for example, as regards a recording material high in volume resistivity, such as synthetic paper including a resin layer or high-resistance paper such as ultra-thick paper, particularly in a low-humidity environment, only by the secondary transfer bias in the secondary transfer portion N2, it is difficult to sufficiently transfer the toner onto the recording material S. Further, in the case where an absolute value of the voltage of the secondary transfer bias is required to be 10 kV or more, in view of a creeping distance or the like in the neighborhood of the secondary transfer portion N2, when an output of the secondary transfer power source is increased, the increased output leads to upsizing of the image forming apparatus 100.

Therefore, in this embodiment, the image forming apparatus 100 is constituted so that a surface of the recording material S onto which the toner image is transferred (herein, this surface is also referred to as "toner image transfer surface") is capable of being charged in advance to an opposite polarity to the normal charge polarity of the toner. By this, even when the absolute value of the voltage of the secondary transfer bias is made relatively small, it becomes possible to appropriately transfer the toner image onto the recording material S by compensating for shortage of the transfer current.

As shown in FIG. 4, in this embodiment, the pre-charging device 9 for charging the toner image transfer surface of the recording material S to the opposite polarity to the normal charge polarity before the recording material S reaches the secondary transfer portion N2 is provided upstream of the secondary transfer portion N2 (downstream of the registration roller pair 14) with respect to the conveying direction of the recording material S. By this, a transfer property of the toner image onto the ultra-thick paper or the synthetic paper can be improved.

In this embodiment, the pre-charging roller 9 is constituted by including the driving roller (secondary transfer belt driving roller) 84 disposed on the inner peripheral surface side of the secondary transfer belt 80 and the pre-charging opposite roller 91 disposed opposed to the driving roller 84 through the secondary transfer belt 80. The driving roller (recording material charging roller) 84 in this embodiment is an example of a recording material charging member (pre-charging member). The driving roller 84 is a stretching roller for the intermediary transfer belt 70 and has a function of a driving roller for driving the secondary transfer belt 80 and a function of the recording material charging member in combination. Further, the pre-charging opposite roller 91 in this embodiment is an example of an opposite member (pre-charging opposite member).

The pre-charging opposite roller 91 forms a desired nip state with the driving roller 84 and nips the recording material S therebetween. That is, the driving roller 84 contacts the pre-charging opposite roller 91 through the secondary transfer belt 80. By this, the secondary transfer belt 80 is nipped by the driving roller 84 and the pre-charging opposite roller 91, so that a pre-charging portion (pre-charging nip, recording material charging portion) N3 which is a contact portion between the secondary transfer belt 80 and the pre-charging opposite roller 91 is formed. Incidentally, a length of a portion, where these rollers are contactable to the recording material S, in a rotational axis direction of the pre-charging opposite roller 91 is longer than a length, in the same direction, of the recording material S usable in the image forming apparatus 100 (i.e., the recording material S falls within a range of the lengths of the respective rollers in the rotational axis direction).

In this embodiment, the pre-charging opposite roller 91 is an elastic sponge roller including a core metal, and an elastic foamed member layer formed with the ion-conductive foamed rubber (NBR rubber, ECO rubber) sufficiently low in electric resistance so as to coat an outer periphery of the core metal. In this embodiment, an outer diameter of the pre-charging opposite roller 91 is 15 mm. The outer diameter of the pre-charging opposite roller 91 is, for example, about 5-30 mm, preferably 10-20 mm. Thus, the pre-charging opposite roller 91 is constituted by a relatively small-diameter roller, whereby a distance between the surface of the pre-charging opposite roller 91 and the surface of the intermediary transfer belt 70 can be sufficiently ensured. A distance from the pre-charging portion N3 to the secondary transfer portion N2 in the conveying direction of the recording material S is, for example, about 10-100 mm, preferably 30 mm or less. By this, in the case where the toner image transfer surface of the recording material S is charged in the pre-charging portion N3, it is possible to suppress attenuation of a charge amount of the toner image transfer surface of the recording material S in a period until the recording material S is conveyed to the secondary transfer portion N2.

In this embodiment, to the core metal of the driving roller 84, the pre-charging power source E5 as a pre-charging voltage applying means (pre-charging voltage applying portion) is connected. Further, to the driving roller 84, a pre-charging bias (recording material charging bias, pre-charging voltage) of the same polarity (negative polarity in this embodiment) as the normal charge polarity of the toner is applied by the pre-charging power source E5. Further, in this embodiment, the core metal of the pre-charging opposite roller 91 is connected to the ground, so that the pre-charging opposite roller 91 is electrically grounded. The pre-charging bias of the same polarity as the normal charge polarity of the toner is applied to the surface of the recording material S opposite from the toner image transfer surface of the recording material S, so that the surface of the recording material S opposite from the toner image transfer surface of the recording material S is charged to the same polarity (negative polarity in this embodiment) as the normal charge polarity of the toner. By this, the toner image transfer surface of the recording material S is charged to the opposite polarity (positive polarity in this embodiment) to the normal charge polarity of the toner by electric charges induced from the ground. At this time, a current apparently flows through the pre-charging portion N3. Details of the pre-charging bias will be described later.

The recording material S conveyed by the registration roller pair 14 is conveyed to the normal (pre-charging portion) N3 between the pre-charging opposite roller 91 and the secondary transfer belt 80 extended around the driving roller 84. Incidentally, in this embodiment, with respect to the conveying direction of the recording material S, a guiding member 22 (upper guiding member 22*a*, lower guiding member 22*b*) for guiding the recording material S is provided upstream of the pre-charging portion N3 and downstream of the registration roller pair 14. The recording material S conveyed by the registration roller pair 14 is conveyed toward the pre-charging portion N3 while being guided by the guiding member 22.

Then, in the pre-charging portion N3, the recording material S is charged (pre-charged), and in addition, the recording material S is electrostatically attracted to the secondary transfer belt 80 (by an electrostatic force). The recording material S attracted to the secondary transfer belt 80 is conveyed to the secondary transfer portion N2, where the toner image is transferred (secondarily transferred) onto the recording material S.

5. Control of Pre-Charging Bias

In this embodiment, the pre-charging bias is applied by the constant-current control. The pre-charging power source E5 incorporates a current detecting portion (not shown) as a current detecting means, and it is possible to carry out the constant-current control of an output voltage so that a value of a current detected by this current detecting portion becomes substantially constant.

Here, depending on the kind of the recording material, the environment, and further the print surface (surface onto which the toner image is transferred in the secondary transfer portion N2 immediately after passing through the pre-charging portion N3, whether the surface is the first surface (side) in one-side printing or the double-side printing or the second surface (side) in the double-side printing), a target current of an appropriate pre-charging bias varies in some instances.

For that reason, on the basis of at least one of the kind of the recording material S, the environment, and the print surface, whether or not the pre-charging bias is applied can be determined, or the target current of the pre-charging bias can be changed. For example, the target current of the pre-charging bias is preset and may be stored as table data or the like in the memory 122 so that the surface of the recording material S onto which the toner image is transferred has an appropriate charge amount depending on the kind of the recording material S or the environment (for example, absolute water content). The appropriate toner amount of the toner image transfer surface of the recording material S can be acquired as an appropriate toner amount providing an appropriate transfer property in advance by an experiment or the like. Further, for example, only in the case where the recording material S of a predetermined kind is used and in addition, the absolute water content falls in a predetermined range (for example, in the case where the absolute water content is lower than a predetermined value), the pre-charging bias may be applied or the like.

In this embodiment, in order to make understanding of the present invention easy, when a job is started, depending on the kind of the recording material S, whether or not the pre-charging bias is applied to the driving roller (propriety of the pre-charging bias) is determined. As an example, in the case where a paper kind category of the synthetic paper or the high-resistance paper (ultra-thick paper) is selected when the job is started, discrimination that the pre-charging is needed is made. In this embodiment, in the case where a paper kind category other than the synthetic paper or the high-resistance paper (ultra-thick paper) is selected, discrimination that the pre-charging is not needed is made.

In this embodiment, for example, in the case where synthetic paper ("YUPO YPI250" (product name), manufactured by YUPO Corp.) is used as the recording material S, for example, in an environment of 23 °C in temperature and 5% RH in humidity, the target current is short only by the secondary transfer bias. For that reason, in this case, the pre-charging bias is applied to the driving roller 84, so that a current of −60 μA is supplied to the driving roller 84. By this, the toner image transfer surface of the recording material S can be charged to about +5 kV.

Figure 5:
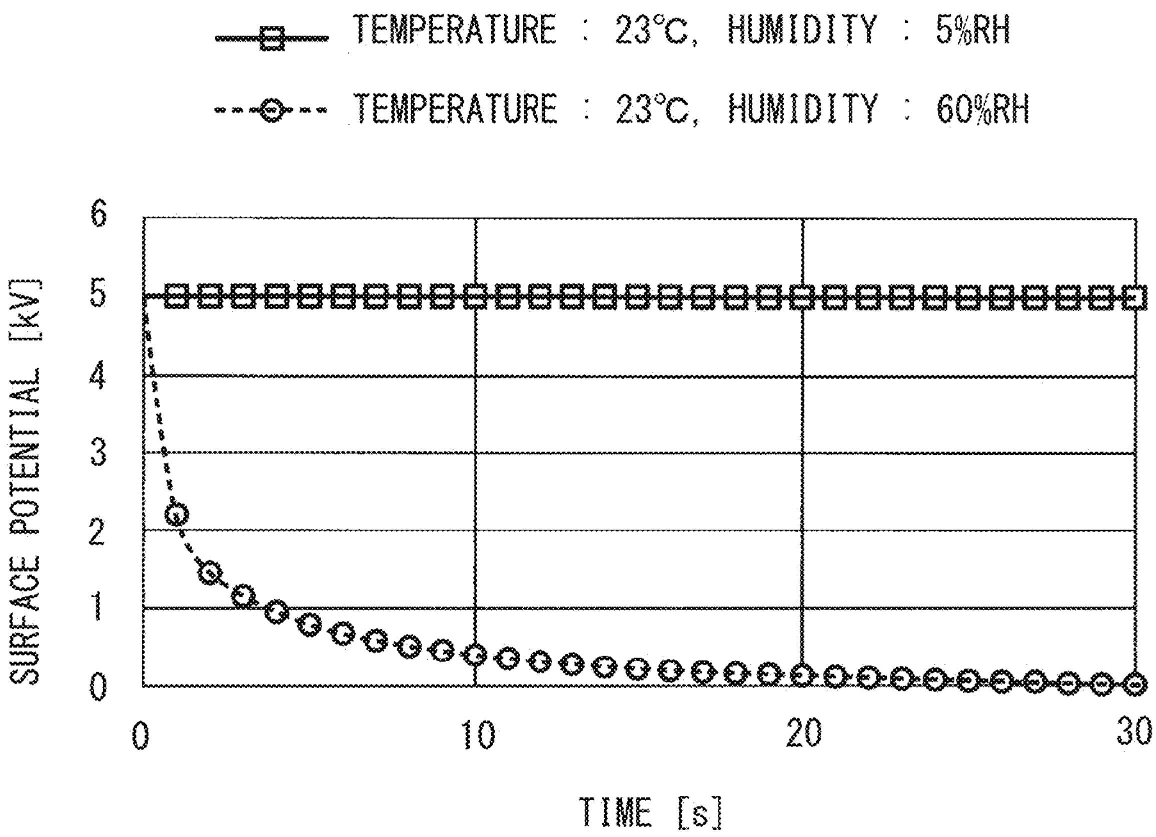
FIG. 5 is a graph showing an example of progression of a charge amount of a recording material.

FIG. 5 is a graph showing progression of the charge amount of the toner image transfer surface of the YUPO YPI250 as the recording material S. In FIG. 5, a change in charge amount, with a lapse of time, from immediately after the toner image transfer surface of the recording material S is charged to 5 kV in each of the environment of 23 °C in temperature and 5% RH in humidity and an environment of 23 °C in temperature and 60% RH in humidity is plotted. In the environment of 23 °C in temperature and 5% RH in humidity, the toner image transfer surface of the recording material S maintains a charged state. On the other hand, in the environment of 23 °C in temperature and 60% RH in humidity, it is understood that the charge amount (absolute value) of the toner image transfer surface of the recording material S abruptly decreases from 5 kV with the lapse of time. This would be considered because this phenomenon occurs due to that the electric charge accumulated in the recording material S is decreased by neutralization by natural discharge and by flowing of the electric charge into the conveying portion or the roller pair which contact the recording material S. For that reason, for example, in the case where the pre-charging is performed at a target current set for the environment of 23 °C in temperature and 5% RH in humidity, the target current becomes short in the environment of 23 °C in temperature and 60% RH in humidity.

Here, as described above, on the basis of the characteristic as shown in FIG. 5, the target current of the pre-charging bias can be preset so as to obtain an appropriate transfer property depending on the environment. For example, in a low-temperature/low-humidity environment in which there is a tendency that a water content of the recording material S lowers, a volume resistivity of the recording material S increases and thus injection of the electric charge into the recording material S does not readily occur, so that impartment of the electric charge becomes difficult. Further, for example, in a high-temperature/high-humidity environment in which there is tendency that the recording material S absorbs moisture, the volume resistivity of the recording material S lowers, so that the electric charge is liable to leak. On the basis of occurrence of such a change, depending on a state of the low-temperature/low-humidity environment, the target current of the pre-charging bias can be changed stepwise. For example, a setting can be made so that an absolute value of the target current of the pre-charging bias in the case where the absolute water content is a second value larger than a first value is made higher than an absolute value of the target current of the pre-charging bias in the case where the absolute water content is the first value. Incidentally, such a setting of the target current of the pre-charging bias depending on the environment can be made every range of a predetermined temperature/humidity environment (absolute water content such as a normal-temperature/low-humidity environment, a normal-temperature/normal-humidity environment, or a high-temperature/high-humidity environment. Further, the setting of the target current of the pre-charging bias depending on the environment can be made every kind of the recording material S. Thus, depending on the environment, by making determination of the propriety of the pre-charging or the setting of the target current of the pre-charging bias, for example, control such that the absolute value of the voltage of the secondary transfer bias is made high in the low-temperature/low-humidity environment and that the absolute value of the voltage of the secondary transfer bias is suppressed to a low level can be carried out.

However, the change in charge amount as shown in FIG. 5 assumes various characteristics depending on a material, a layer structure, a storage status, and the like of the recording material S, and therefore, it is hard to predict the change in charge amount with accuracy. For that reason, even in the case where the determination of the propriety of the pre-charging or the setting of the target current of the pre-charging bias is made depending on the environment as described above, under setting acquired in advance, the target current becomes short in some instances. The same applies to the case where the determination of the property of the pre-charging or the setting of the target current of the pre-charging bias is made depending on the print surface of the recording material S as described above.

Therefore, in this embodiment, the image forming apparatus 100 is constituted so that the pre-charging bias can be adjusted (corrected) on the basis of a current detected by the convey detecting sensor **25*b* when the recording material S passes through the secondary transfer portion N2 during execution of the job. In this embodiment, a target current (initial value) of the pre-charging bias set when the job is started is changed on the basis of a detection result of the convey detecting sensor 25*b*. Further, even in the case where discrimination that the pre-charging is not needed is made when the job is started and thus the pre-charging is turned off (0 V), the pre-charging is turned on based on the detection result of the current detecting sensor 25*b*. In this case, the target current of the pre-charging bias can be set on the basis of the detection result of the current detecting sensor 25*b***.

In this embodiment, every conveyance of each recording material S to the secondary transfer portion N2 during the execution of the job, current detection by the current detecting sensor **25*b* is performed. Then, in the case where the target current of the pre-charging bias is changed on the basis of the detection result of the current detecting sensor 25*b***, the target current after the change is maintained until discrimination that the change is needed is subsequently made.

In this embodiment, a timing when the detection result of the current detecting sensor **25*b* is acquired when the recording material S passes through the secondary transfer portion N2 is set to during passing, through the secondary transfer portion N2, of a leading end portion (a leading end side relative to a central portion with respect to the conveying direction) of the recording material S with respect to the recording material conveying direction. This timing is typically during passing, through the secondary transfer portion N2, of a region (margin) other than an image forming region (region in which the toner image is capable of being transferred) on the leading end side of the recording material S with respect to the conveying direction, but may also be during passing, through the secondary transfer portion N2**, of the image forming region of the recording material S with respect to the conveying direction.

In this embodiment, when the current detection by the current detecting sensor **25*b* is performed, the secondary transfer bias (secondary transfer bias subjected to the constant-voltage control at the same target voltage) substantially identical to the secondary transfer bias at the time when the toner image is transferred onto the recording material S is applied to the inner secondary transfer roller 71. By this, a current which is the sum of a current passed by the secondary transfer bias and a current depending on the charge amount of the toner image transfer surface of the recording material S is detected by the current detecting sensor 25*b*. However, in the case where the current detection by the current detecting sensor 25*b* is performed when the margin of the recording material S on the leading end side with respect to the conveying direction passes through the secondary transfer portion N2, the following operation may be performed. That is, for example, when the current detection by the current detecting sensor 25*b* is performed, a test bias different from the secondary transfer bias when the toner image is transferred onto the recording material S may be applied to the inner secondary transfer roller 71. Or, when the current detection by the current detecting sensor 25***b* is performed, application of the bias to the inner secondary transfer roller 71 does not have to be made. In the case where the application of the bias to the inner secondary transfer roller 71 is not made, the current depending on the charge amount of the toner image transfer surface of the recording material S is detected by the current detecting sensor 25*b*. That is, it may only be required that the current flowing depending on the charge amount of the toner image transfer surface of the recording material S can be detected.

In the constitution of this embodiment, for example in the case where the YUPO YPI250 is used as the recording material S, for example, in the environment of 23 °C in temperature and 5% RH in humidity, in order to appropriately transfer the toner image onto the recording material S, a secondary transfer current In is needed to be −100 μA or more (for example, −100 μA to −120 μA)

For that reason, in this embodiment, a threshold for being compared with the detection result of the current detecting sensor 25*b* is set, and in the case where the detection result of the current detecting sensor 25*b* exceeds (crosses) the threshold toward a transfer current shortage side, discrimination that the change in target current of the pre-charging bias is needed is made. Specifically, in this embodiment, the threshold is set to −100 μA. Incidentally, for convenience, as regards a magnitude relationship between the current value and the threshold, this relationship will be described as the magnitude relationship in the case where these values are compared in terms of an absolute value. That is, in this embodiment, in the case where the detection result of the current detecting sensor 25*b* is less than −100 μA, which is the threshold (for example, in the case where the detection result is −80 μA), that the change in target current of the pre-charging bias is needed is discriminated. The secondary transfer current In needed for appropriately transfer of the toner image onto the recording material S varies depending on the kind of the recording material S, the environment, and further the print surface (surface onto which the toner image is transferred in the secondary transfer portion N2, whether or not the print surface is a first surface (side) in the one-side printing or the double-side printing or is a second surface (side) in the double-side printing) in some instances. For that reason, the above-described threshold can be changed on the basis of at least one of the kind of the recording material, the environment, and the print surface. For example, a setting can be made so that the absolute value of the threshold in the case where the absolute water content is a second value larger than a first value is made smaller than the absolute value of the threshold in the case where the absolute water content is the first value. Incidentally, such a setting of the threshold can be made for every range of a predetermined temperature/humidity environment (absolute water content or the like) such as a normal-temperature/low-humidity environment (or low-temperature/low-humidity environment), a normal-temperature/normal-humidity environment, or a high-temperature/high-humidity environment. The threshold is preset and is stored as table data or the like in the memory 122.

In this embodiment, the target current of the pre-charging bias is changed at the same time on the basis of information showing a tendency of the change in charge amount of the toner image transfer surface of the recording material S due to a change in target current of the pre-charging bias acquired in advance. That is, on the basis of the information, a change amount of the target current of the pre-charging bias for preventing the detection result of the current detecting sensor 25*b* from exceeding the threshold toward the transfer current shortage side is determined. Specifically, in this embodiment, the target current of the pre-charging bias is changed at the same time so that the detection result of the current detecting sensor 25*b* becomes not less than −100 μA, which is the threshold (for example, the detection result of the current detecting sensor 25*b* becomes −100 μA to −120 μA). However, a changing method of the target current of the pre-charging bias is not limited thereto, but the target current of the pre-charging bias may be gradually changed. In the case where the target current of the pre-charging bias is gradually changed, the target current of the pre-charging bias can be changed stepwise every predetermined change amount (for example, every 1 μA to 10 μA in terms of the value) or can be changed linearly or curvedly. Further, for example, in the case where the detection result of the current detecting sensor 25*b* does not exceed the threshold toward the transfer current shortage side, the change in target current of the pre-charging bias can be ended.

In this embodiment, in the case where discrimination that the change in target current of the pre-charging bias is needed is made on the basis of the current detected for a certain recording material S (typically, a first recording material S in the job), the change is made during passing of the recording material S through the pre-charging portion N3. However, for example, depending on the size of the recording material S, a needed change amount of the target current of the pre-charging bias, or the like, in the case where discrimination that the change in target current of the pre-charging bias is needed is made on the basis of the current detected for the certain recording material S, the change may be made after the recording material S passes through the pre-charging portion N3.

A timing after the recording material S passes through the pre-charging portion N3 includes a timing (sheet interval) when the recording material S is absent in the pre-charging portion N3 after the recording material S passes through the pre-charging portion N3, and a timing when a recording material S (for example, a subsequent recording material S) is present in the pre-charging portion N3 after the present recording material S passes through the pre-charging portion N3.

Further, in this embodiment, a single threshold is set, but a plurality of thresholds may be set, and then the target current of the pre-charging bias may be changed stepwise every time when the detection result of the current detecting sensor 25*b* exceeds the associated threshold.

6. Control Procedure

Figure 6:
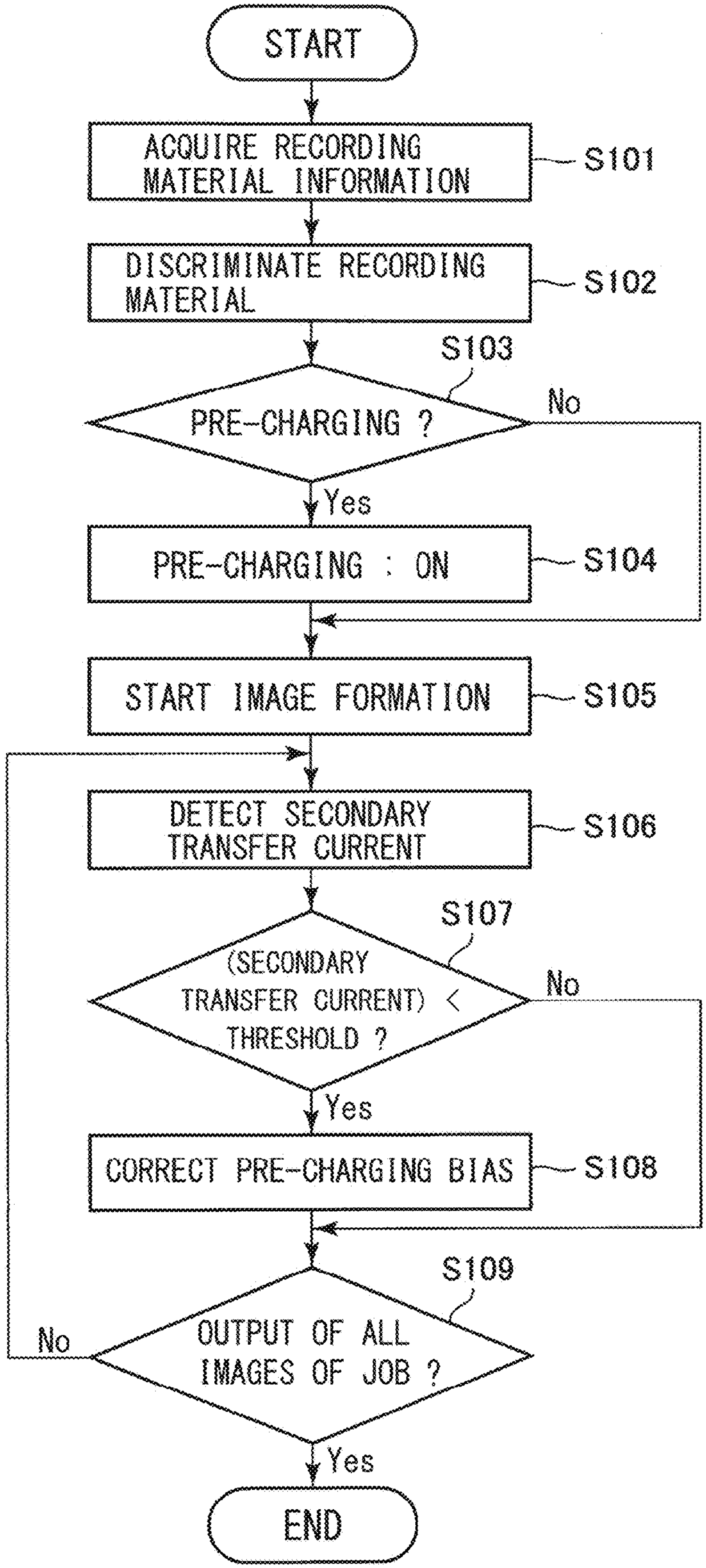
FIG. 6 is a flowchart of control in embodiment 1.

Next, a control procedure of a job including pre-charging bias adjustment control in this embodiment will be described. FIG. 6 is a flowchart showing an outline of the control procedure of the job including the pre-charging bias adjustment control in this embodiment. As described above, in this embodiment, when the job is started, it is discriminated that the pre-charging is needed in the case where a paper kind category of the synthetic paper or the predetermined high-resistance paper (ultra-thick paper or the like) is selected, and it is discriminated that the pre-charging is not needed in the case where a paper kind category other than the above-described paper is selected.

First, when information designating the kind of the recording material S or information on the job including image information is input from the operating portion 130 or the external device such as the personal computer by the user (S101), the controller 120 discriminates the kind of the recording material S used in the image formation (S102). Incidentally, the information designating the kind of the recording material S may be information designating either one of the cassettes 11*a* and 11*b* in which the recording materials S are accommodated. In this case, the controller 120 is capable of discriminating the kind of the recording material S used in the image formation from information showing a preset relationship between the cassette 11*a* and 11*b* with the kind of the recording materials S accommodated therein. Then, the controller 120 discriminates whether or not the pre-charging is needed, on the basis of the acquired information on the kind of the recording material S (S103).

In the case where the controller 120 discriminated in S103 that the pre-charging is needed, the controller 120 causes the pre-charging power source to apply the pre-charging bias to the driving roller 84 (S104) and then causes the image forming apparatus to start the image formation (S105). Incidentally, in the case where the controller 120 discriminated in S103 that the pre-charging is needed, the controller 120 sets a target current (initial value) of the pre-charging bias depending on the kind of the recording material S in S104. Incidentally, as described above, in the case where determination of the propriety of the pre-charging and the setting of the target current of the pre-charging bias are made depending on the environment, the following operation may only be required to be performed. That is, the controller 120 may only be required to perform the above-described determination and setting depending on the temperature/humidity information in S103 and S104 by acquiring, for example, the absolute water content as the temperature/humidity information through acquisition of the detection result of the environment sensor 18 in S102. Further, as described above, in the case where the determination of the propriety of the pre-charging and the setting of the target current of the pre-charging bias are made depending on the print surface, the following operation may only be required to be performed. That is, the controller 120 may only be required to perform the above-described determination and setting depending on the print surface in S103 and S104 by acquiring information on the print surface in S102. Further, in the case where the controller 120 discriminated in S103 that the pre-charging is not needed, the controller 120 does not cause the pre-charging power source to apply the pre-charging bias to the driving roller 84 (pre-charging bias: 0 V), and causes the image forming apparatus to start the image formation (S105). Here, for convenience of explanation, a start of the application of the pre-charging bias and a start of the image formation are described in series, but the formation of the toner image on the photosensitive drum 1 or the intermediary transfer belt 70 may be started before the application of the pre-charging bias is started.

When the leading end of the recording material S with respect to the conveying direction enters the secondary transfer portion N2, the controller 120 acquires a detection result of the secondary transfer current In during passing of the recording material S through the secondary transfer portion N2 by the current detecting sensor 25*b* (S106).

Then, the controller 120 discriminates whether or not the detected current value is less than the threshold (for example, −100 μA) (S107). In the case where the controller 120 discriminated in S107 that the detected current value is less than the threshold, the controller 120 makes correction of the pre-charging bias by changing the target current of the pre-charging bias (S108). On the other hand, in the case where the controller 120 discriminates in S107 that the detected current value is the threshold or more, the sequence goes to S109.

In this embodiment, in the case where the paper kind category of the synthetic paper is selected as the kind of the recording material S, the application of the pre-charging bias is performed with the target current of −60 μA. By this, the toner image transfer surface of the recording material S is charged to about 5 kV. Further, in the constitution of this embodiment, for example, in the case where the YUPO YPI250 is used as the recording material S, in order to appropriately transfer the toner image onto the recording material S, for example, in the environment of 23 °C in temperature and 5% RH in humidity, the secondary transfer current In is required to be −100 μA or more (for example, −100 μA to −120 μA). For that reason, in this embodiment, the above-described threshold is set to −100 μA. In the case where the YUPO YPI250 is used as the recording material S, in the environment of 23 °C in temperature and 5% RH in humidity, the toner image transfer surface of the recording material S when the recording material S reaches the secondary transfer portion N2 maintains a state in which the toner image transfer surface is charged to about 5 kV (see FIG. 5). For that reason, in this case, the secondary transfer current In when the recording material S discriminates through the secondary transfer portion N2 becomes −100 μA or more (for example, −120 μA) (table 1 appearing hereinafter), so that it is discriminated that the change in target current of the pre-charging bias is not needed (No of S107). On the other hand, in the case where the YUPO YPI250 is used as the recording material S, in the environment of 23 °C in temperature and 60% RH in humidity, a charge amount of the toner image transfer surface of the recording material S when the recording material S reaches the secondary transfer portion N2 is about 3 kV (see FIG. 5). For that reason, in this case, the secondary transfer current In when the recording material S passes through the secondary transfer portion N2 becomes less than −100 μA (for example, −80 μA) (table 1), so that it is discriminated that the change in target current of the pre-charging bias is needed (Yes of S107). Further, for example, in the environment of 23 °C in temperature and 60% RH in humidity, in the case where the detected secondary transfer current In is −80 μA, the target current of the pre-charging bias is changed to −100 μA obtained by adding −40 μA to −60 μA which is the initial value (table 1). By this, the charge amount of the toner image transfer surface of the recording material S when the recording material S reaches the secondary transfer portion N2 becomes about 5 kV. For that reason, the secondary transfer current In when the recording material S passes through the secondary transfer portion N2 becomes −100 μA or more (for example, −120 μA), so that the toner image can be appropriately transferred onto the recording material S. That is, by correcting the pre-charging bias, the electric charge necessary for appropriately transferring the toner image onto the recording material S can be imparted to the toner image transfer surface of the recording material S in the pre-charging portion N3. Further, in this embodiment, at a timing when the leading end of the recording material S with respect to the conveying direction enter the secondary transfer portion N2, the correction of the pre-charging bias is made immediately during passing of the recording material S through the secondary transfer portion N2. For that reason, a lowering in image quality at a timing of correction of the pre-charging bias and later can be alleviated.

Thereafter, the controller 120 discriminates whether or not output of all the images designated in the job is ended (S109). In the case where the output is ended, the operation of the job is ended, and in the case where the output is not ended, the sequence returns to the process of S106.

TABLE 1

| ENVIRONMENT | STC*[1]In | TCCA*[2] |
|---|---|---|
| 23° C./5% RH | −120 μA | 0 μA (NO CHANGE) |
| 23° C./60% RH | −80 μA | −40 μA (ADDED) |

*[1]"STC" is the secondary transfer current.
*[2]"TCCA" is the target current change amount of the pre-charging bias.

Incidentally, in this embodiment, the pre-charging bias (recording material charging bias) is subjected to the constant-current control, but the pre-charging bias may be subjected to the constant-voltage control. It is only required that the toner image transfer surface of the recording material S can be charged to the opposite polarity to the normal charge polarity. In the case where the pre-charging bias is subjected to the constant-voltage control, in place of the target current in this embodiment, a target voltage may only be required to be adjusted.

Further, in this embodiment, the secondary transfer bias is subjected to the constant-voltage control, but the secondary transfer bias may be subjected to the constant-current control. In the case where the secondary transfer bias is subjected to the constant-current control, in place of detection of the current by the current detecting sensor 25*b* when the recording material S passes through the secondary transfer portion N2 during execution of the job in this embodiment, detection of the voltage by the voltage detecting sensor 25*a* may only be required to be performed. A higher absolute value of the detected voltage means that the charge amount (absolute value) of the toner image transfer surface of the recording material S by the pre-charging is smaller.

Thus, in this embodiment, the image forming apparatus 100 includes the image bearing member (intermediary transfer belt) 70 for bearing the toner image, the transfer member (inner secondary transfer roller 71, outer secondary transfer roller 81) for forming the transfer portion (secondary transfer portion) N2 for transferring the toner image from the image bearing member 70 onto the recording material S, a first applying portion (secondary transfer power source) E4 for applying the transfer bias to the transfer portion N2, the recording material charging member (secondary transfer belt driving roller) 84 for electrically charging, to the opposite polarity to the normal charge polarity of toner, the toner image transfer surface of the recording material S which is a surface which is conveyed toward the transfer portion N2 and onto which the toner image is transferred on a side upstream of the transfer portion N2 with respect to the conveying direction of the recording material S, a second applying portion (pre-charging power source) E5 for applying the recording material charging bias, (pre-charging bias) to the recording material charging member 84, for charging the toner image transfer surface of the recording material S, the detecting portion (in this embodiment, the current detecting sensor 25*b*) for detecting the current flowing through the transfer portion N2 and a voltage applied to the transfer portion N2, and the controller 120 for executing control for changing a setting of the recording material charging bias on the basis of the detection result by the detecting portion 25*b* when the recording material S passes through the transfer portion N2. In this embodiment, during execution of the job which is a series of operations for forming the image(s) on the single recording material S or the plurality of the recording materials S and the outputting the recording material(s) S, the controller 120 executes the control for changing the setting of the recording material charging bias, on the basis of the detection result by the detecting portion 25*b* when the recording material S passes through the transfer portion N2.

In this embodiment, the controller 120 carries out control in which a setting of the recording material charging bias is not changed in a case where an absolute value of a current detected by the detecting portion 25*b* is a first value and in which the setting of the recording material charging bias is changed so that the absolute value of the recording material charging bias is made high in a case where the absolute value of the current detected by the detecting portion 25*b* is a second value lower than the first value. In this case, during detection of the current by the detecting portion 25*b*, to the transfer portion N2, the bias subjected to constant-voltage control is applied by the first applying portion E4. Further, the controller 120 can also carry out control in which a setting of the recording material charging bias is not changed in a case where an absolute value of a voltage detected by the detecting portion (voltage detecting sensor) 25*a* is a first value and in which the setting of the recording material charging bias is changed so that the absolute value of the recording material charging bias is made high in a case where the absolute value of the voltage detected by the detecting portion 25*a* is a second value higher than the first value. In this case, during detection of the voltage by the detecting portion 25*a*, to the transfer portion N2, a bias subjected to constant-current control is applied by the first applying portion E4. Further, in this embodiment, the above-described image bearing member 70 is the intermediary transfer member (intermediary transfer belt) onto which the toner image is transferred from another image bearing member (photosensitive drum) 1.

As described above, according to this embodiment, irrespective of a setting state of the recording material S, a necessary electric charge can be appropriately imparted to the toner image transfer surface of the recording material S before the transfer so that an appropriate transfer property can be obtained depending on the recording material S actually used in the image formation. By this, a lowering in image quality caused by that the necessary electric charge is not held on the toner image transfer surface of the recording material S when the recording material S reaches the secondary transfer portion N2 can be alleviated. According to this embodiment, for example, even in the case where the electric charge necessary for being imparted to the toner image transfer surface of the recording material S before the transfer is largely changed due to a change in environment or the like in which the recording material S high in electric resistance is put, it is possible to obtain an appropriate transfer property by correcting the pre-charging bias. Thus, according to this embodiment, depending on the recording material S actually used in the image formation, the toner image transfer surface of the recording material S can be charged to the opposite polarity to the normal charge polarity of the toner appropriately before the recording material S reaches the secondary transfer portion N2.

Incidentally, the threshold of the secondary transfer current In in this embodiment is an example, and is not limited thereto. This threshold can be arbitrarily set within a range in which an occurrence of the image defect, such as the transfer void or the poor density, caused due to that the toner image is not sufficiently transferred from the image bearing member onto the recording material S.

Embodiment 2

Next, another embodiment of the present invention will be described. Basic constitutions and operations of an image forming apparatus in this embodiment are the same as those of the image forming apparatus of the embodiment 1. Accordingly, in the image forming apparatus of this embodiment, elements having the same or corresponding functions or constitutions as those of the image forming apparatus of the embodiment 1 are represented by the same reference numerals or symbols as those in the embodiment 1 and will be omitted from detailed description.

1. Outline of this Embodiment

In the embodiment 1, the pre-charging bias was corrected in the case where the detection result of the secondary transfer current In when the recording material S passes through the secondary transfer portion N2 exceeds the threshold toward the transfer current shortage side. On the other hand, in this embodiment, the pre-charging bias is corrected in the case where the detection result of the secondary transfer current In when the recording material S passes through the secondary transfer portion N2 exceeds the threshold toward a transfer current excess side.

For example, similarly as in the embodiment 1, when the job is started, it is discriminated that the pre-charging is needed in the case where the paper kind category of the synthetic paper or the predetermined high-resistance paper (ultra-thick paper or the like) is selected, and it is discriminated that the pre-charging is not needed in the case where the paper kind category other than the above-described paper is selected. In the constitution of this embodiment, in the case where the paper kind category of the synthetic paper is selected as the kind of the recording material S, for example, in the environment of 23 °C in temperature and 5% RH in humidity, the transfer current is short only by the secondary transfer bias.

For that reason, in this case, application of the pre-charging bias with a target current of −60 μA.

However, due to that the set paper kind category information and the kind (characteristic) of the recording material S actually used in the image formation do not coincide with each other or the like, it is assumed that the electric charge is imparted to the toner image transfer surface of the recording material in an amount more excessive than an originally necessary electric charge. In this case, an excessive current flows through the secondary transfer portion N2 and thus the electric discharge occurs in the secondary transfer portion N2. By the influence of this electric discharge, the polarity of the electric charge of the toner of the toner image is reversed or the like, so that there is a possibility that the image defect such as the "white void" such that the toner image is not partially transferred occurs.

Therefore, in this embodiment, similarly as in the embodiment 1, the image forming apparatus 100 is constituted so that the pre-charging bias can be adjusted (corrected) on the basis of a current detected by the convey detecting sensor 25*b* when the recording material S passes through the secondary transfer portion N2 during execution of the job. In this embodiment, a target current (initial value) of the pre-charging bias set when the job is started is changed on the basis of a detection result of the convey detecting sensor 25*b*. Further, even in the case where discrimination that the pre-charging is needed is made when the job is started and thus the pre-charging is turned on, the pre-charging is turned off on the basis of the detection result of the current detecting sensor 25*b*.

In the constitution of this embodiment, the secondary transfer current In at which the image defect due to a flow of an excessive current through the recording material S does not occur is less than −130 μA.

For that reason, in this embodiment, a threshold for being compared with the detection result of the current detecting sensor 25*b* is set, and in the case where the detection result of the current detecting sensor 25*b* exceeds (crosses) the threshold toward a transfer current excess side, discrimination that the change in target current of the pre-charging bias is needed is made. Specifically, in this embodiment, the threshold is set to −130 μA. That is, in this embodiment, in the case where the detection result of the current detecting sensor 25*b* is not less than −130 μA which is the threshold (for example, in the case where the detection result is −140 μA), discrimination that the change in target current of the pre-charging bias is needed. The secondary transfer current In at which the image defect due to the flow of the excessive current through the recording material S does not occur varies depending on the kind of the recording material S, the environment, and further the print surface (surface onto which the toner image is transferred in the secondary transfer portion N2, whether or not the print surface is a first surface (side) in the one-side printing or the double-side printing or is a second surface (side) in the double-side printing) in some instances. For that reason, the above-described threshold can be changed on the basis of at least one of the kind of the recording material, the environment, and the print surface. For example, a setting can be made so that the absolute value of the threshold in the case where the absolute water content is a second value larger than a first value is made larger than the absolute value of the threshold in the case where the absolute water content is the first value. Incidentally, such a setting of the threshold can be made every range of a predetermined temperature/humidity environment (absolute water content or the like) such as a normal-temperature/low-humidity environment (or low-temperature/low-humidity environment), a normal-temperature/normal-humidity environment, or a high-temperature/high-humidity environment. The threshold is preset and is stored as table data or the like in the memory 122.

Further, other points as to a changing method and a changing timing of the target current of the pre-charging bias, which were described in the case where the absolute value of the target current of the pre-charging bias is made high in the embodiment 1 also applies to the case where the absolute value of the target current of the pre-charging bias is made low in this embodiment.

2. Control Procedure

Figure 7:
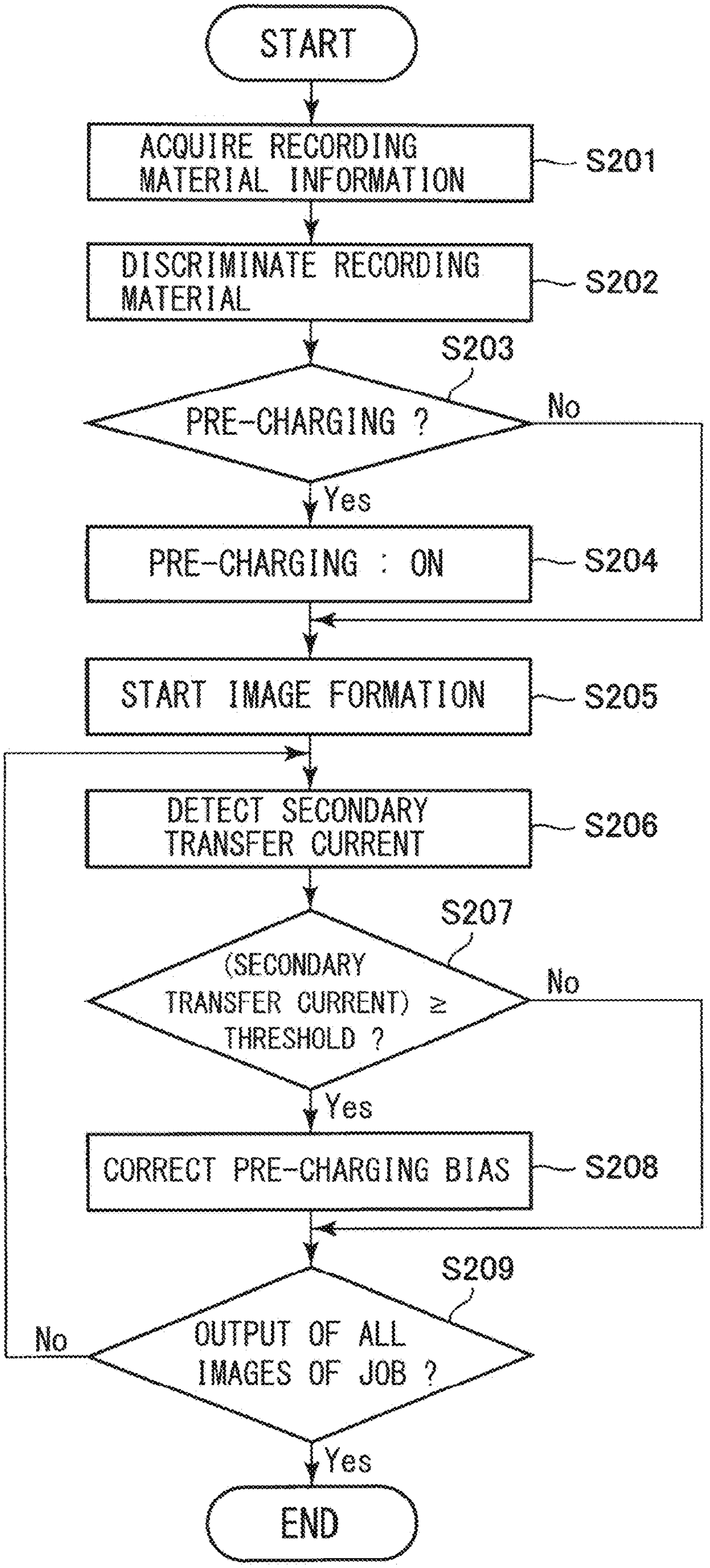
FIG. 7 is a flowchart of control in an embodiment 2.

Next, a control procedure of a job including pre-charging bias adjustment control in this embodiment will be described. FIG. 7 is a flowchart showing an outline of the control procedure of the job including the pre-charging bias adjustment control in this embodiment. As described above, in this embodiment, when the job is started, it is discriminated that the pre-charging is needed in the case where a paper kind category of the synthetic paper or the predetermined high-resistance paper (ultra-thick paper or the like) is selected, and it is discriminated that the pre-charging is not needed in the case where a paper kind category other than the above-described paper is selected. Further, in this embodiment, the environment is 23 °C in temperature and 5% RH in humidity.

In this embodiment, processes S201 to S209 are similar to processes S101 to S109, respectively, shown in FIG. 6 in the embodiment 1, and discrimination contents and adjustment contents in S207 and S208 are different from S107 and S108, respectively, in the embodiment 1. In the processes of the procedure shown in FIG. 7, the processes similar to those of the procedure shown in FIG. 6 will be appropriately omitted from description.

In this embodiment, the controller 120 discriminates whether or not the detected current value is not less than the threshold (for example, −130 μA) (S207). In the case where the controller 120 discriminated in S207 that the detected current value is not less than the threshold, the controller 120 makes correction of the pre-charging bias by changing the target current of the pre-charging bias (S208). On the other hand, in the case where the controller 120 discriminates in S207 that the detected current value is less than the threshold, the sequence goes to S209.

In this embodiment, in the case where the paper kind category of the synthetic paper is selected as the kind of the recording material S, the application of the pre-charging bias is performed with the target current of −60 μA. By this, the toner image transfer surface of the recording material S is charged to about 5 kV. Further, in the constitution of this embodiment, the secondary transfer current In is at which the image defect due to the flow of the excessive current through the recording material S is less than −130 μA. For that reason, in this embodiment, the above-described threshold is set to −130 μA. Here, when the synthetic paper is set as a paper kind information, the case where as the recording material S, the YUPO YPI250 which is the synthetic paper or paper ("OK Topkote Plus" (product name, basis weight: 128 gsm), manufactured by Oji Paper Co., Ltd.) which is not the synthetic paper is used will be considered. The OK Topkote Plus (128 gsm) is coated paper (glossy paper) obtained by subjecting a surface of paper composed mainly of a pulp to coating. The OK Topkote Plus (128 gsm) has the same thickness as the YUPO YPI250, but the electric resistance thereof is lower than the electric resistance of the YUPO YPI250. In the case where the YUPO YPI250 is used as the recording material S, in the environment of 23 °C in temperature and 5% RH in humidity, the secondary transfer current In when the recording material S discriminates through the secondary transfer portion N2 becomes less than −130 μA (for example, −120 μA) (table 2 appearing hereinafter), so that it is discriminated that the change in target current of the pre-charging bias is not needed (No of S107). On the other hand, in the case where the OK Topkote Plus (128 gsm) is used as the recording material S, in the environment of 23 °C in temperature and 50% RH in humidity, the secondary transfer current In when the recording material S passes through the secondary transfer portion N2 becomes not less than −130 μA (for example, −140 μA) (table 2), so that it is discriminated that the change in target current of the pre-charging bias is needed (Yes of S207). Further, for example, when the OK Topkote Plus (128 gsm) is used as the recording material S, in the case where the detected secondary transfer current In is −140 μA, the target current of the pre-charging bias is changed to −40 μA obtained by subtracting −20 μA from −60 μA which is the initial value (table 2). By this, the secondary transfer current In when the recording material S passes through the secondary transfer portion N2 becomes −130 μA or less (for example, −120 μA), so that the toner image can be appropriately transferred onto the recording material S without causing the image defect due to the flow of the excessive current. That is, by correcting the pre-charging bias, the electric charge necessary and sufficient for appropriately transferring the toner image onto the recording material S can be imparted to the toner image transfer surface of the recording material S in the pre-charging portion N3. Incidentally, in the case where the OK Topkote Plus (128 gsm) is used as the recording material S, when the coated paper is properly set as the paper kind category information, the pre-charging bias is not applied (No of S203). For that reason, in the environment of 23 °C in temperature and 5% RH in humidity, the secondary transfer current In when the recording material S passes through the secondary transfer portion N2 becomes less than −130 μA (for example, −120 μA), so that it is discriminated that the pre-charging is not needed (No of S207).

TABLE 2

| RM*[1] | ENVIRONMENT | STC*[2]In | TCCA*[3] |
|---|---|---|---|
| YPI250 | 23° C./5% RH | −120 μA | 0 μA (NO CHANGE) |
| OKT(+) | 23° C./5% RH | −140 μA | −20 μA (SUBTRACTED) |

*[1]"RM" is the recording material. "YPI250" is the YUPO YPI250. "OKT(+)" is the OK Topkote Plus (128 gsm).
*[2]"STC" is the secondary transfer current.
*[3]"TCCA" is the target current change amount of the pre-charging bias.

Incidentally, in this embodiment, the pre-charging bias (recording material charging bias) is subjected to the constant-current control, but the pre-charging bias may be subjected to the constant-voltage control. It is only required that the toner image transfer surface of the recording material S can be charged to the opposite polarity to the normal charge polarity. In the case where the pre-charging bias is subjected to the constant-voltage control, in place of the target current in this embodiment, a target voltage may only be required to be adjusted.

Further, in this embodiment, the secondary transfer bias is subjected to the constant-voltage control, but the secondary transfer bias may be subjected to the constant-current control. In the case where the secondary transfer bias is subjected to the constant-current control, in place of detection of the current by the current detecting sensor **25*b* when the recording material S passes through the secondary transfer portion N2 during execution of the job in this embodiment, detection of the voltage by the voltage detecting sensor 25*a*** may only be required to be performed. A lower absolute value of the detected voltage means that the charge amount (absolute value) of the toner image transfer surface of the recording material S by the pre-charging is larger.

Thus, the controller 120 carries out control in which a setting of the recording material charging bias is not changed in a case where an absolute value of a current detected by the detecting portion (current detecting sensor) **25*b* is a first value and in which the setting of the recording material charging bias is changed so that the absolute value of the recording material charging bias is made low in a case where the absolute value of the current detected by the detecting portion 25*b* is a second value higher than the first value. In this case, during detection of the current by the detecting portion 25*b*, to the transfer portion N2, the bias subjected to constant-voltage control is applied by the first applying portion (secondary transfer power source) E4. Further, the controller 120 can also carry out control in which a setting of the recording material charging bias is not changed in a case where an absolute value of a voltage detected by the detecting portion (voltage detecting sensor) 25*a* is a first value and in which the setting of the recording material charging bias is changed so that the absolute value of the recording material charging bias is made low in a case where the absolute value of the voltage detected by the detecting portion 25*a* is a second value lower than the first value. In this case, during detection of the voltage by the detecting portion 25*a*, to the transfer portion N2, a bias subjected to constant-current control is applied by the first applying portion E4**.

As described above, according to this embodiment, irrespective of a setting state of the recording material S, a necessary and sufficient electric charge can be appropriately imparted to the toner image transfer surface of the recording material S before the transfer so that an appropriate transfer property can be obtained depending on the recording material S actually used in the image formation. By this, a lowering in image quality caused by the excessive current flowing when the recording material S reaches the secondary transfer portion N2 can be alleviated. According to this embodiment, for example, even in the case where a state in which the excessive electric charge imparted by the pre-charging is formed by that the paper kind category information and the kind (characteristic) of the recording material S actually used in the image formation do not coincide with each other or the like, it is possible to obtain an appropriate transfer property by correcting the pre-charging bias.

Incidentally, the threshold of the secondary transfer current In in this embodiment is an example, and is not limited thereto. This threshold can be arbitrarily set within a range in which an occurrence of the image defect, such as the white void, caused due to that the excessive current flows when the recording material S passes through the transfer portion and thus electric discharge occurs in the transfer portion.

Further, the control in the embodiment 1 such that the absolute value of the target value of the pre-charging bias is made high in the case where the transfer current becomes short and the control in this embodiment such that the absolute value of the target value of the pre-charging bias is made low in the case where the transfer current becomes excessive may be carried out in combination.

Other Embodiments

In the above, the present invention was described in accordance with specific embodiments, but is not limited to the above-described embodiments.

Figure 8:
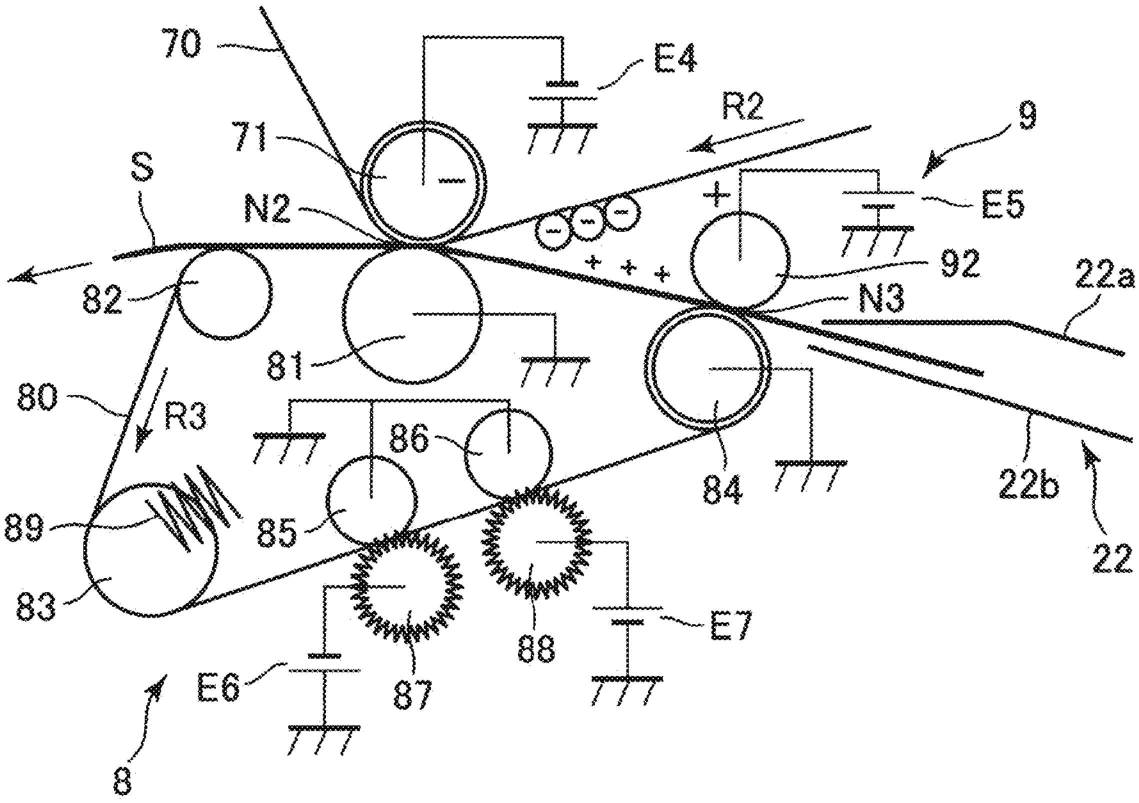
FIG. 8 is a schematic sectional view showing another example of a structure of a neighborhood of a secondary transfer portion.
Figure 9:
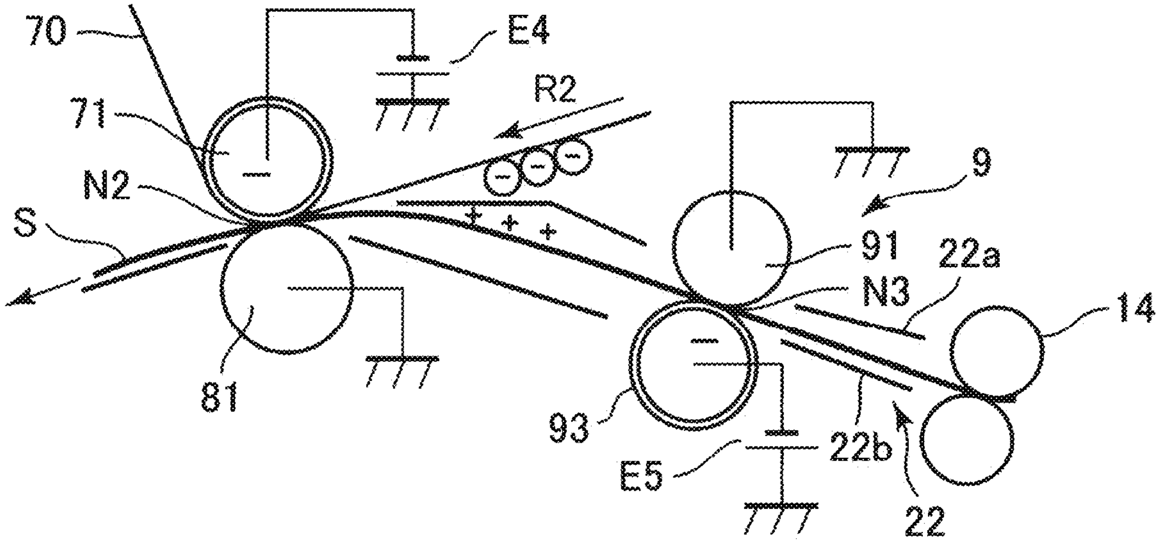
FIG. 9 is a schematic sectional view showing another example of a structure of a neighborhood of a secondary transfer portion.

In the above-described embodiments, the roller (the driving roller 84 in the above-described embodiments) provided on the inner peripheral surface side of the secondary transfer belt 80 was used as the recording material charging member, but the present invention is not limited to such a constitution. Some modified embodiments will be described. Incidentally, also as regards constitutions of the modified embodiments, elements having identical or corresponding functions or constitutions to those in the above-described embodiments will be described by adding thereto the same reference numerals or symbols. For example, as shown in FIG. 8, a constitution in which a pre-charging bias of the opposite polarity (positive polarity in the embodiment of FIG. 8) to the normal charge polarity of the toner is applied to a pre-charging roller 92 as the recording material charging member corresponding to the pre-charging opposite roller 91 in the above-described embodiments by the pre-charging power source E5 may be employed. In this case, the driving roller (secondary transfer belt driving roller) 84 as the opposite member is electrically grounded. Further, for example, as shown in FIG. 9, a constitution in which a roller pair for charging the recording material S is provided upstream of the secondary transfer portion N2 with respect to the conveying direction of the recording material S may be employed. In the constitution of FIG. 9, the pre-charging device 9 is constituted by including a pre-charging roller 93 contacting a surface of the recording material S opposite from the toner image transfer surface of the recording material S and a pre-charging opposite roller 91 contacting the toner image transfer surface of the recording material S.

Also, in this case, similarly as in the constitution of FIG. 8, to the roller corresponding to the pre-charging opposite roller 91 in the constitution of FIG. 9, the pre-charging bias of the opposite polarity to the normal charge polarity of the toner may be applied, and the roller corresponding to the pre-charging roller 93 in the constitution of FIG. 9 may be electrically grounded. Further, on a side upstream of the secondary transfer portion N2 with respect to the conveying direction of the recording material S, a corona charger (including an electric discharge member or the like as the recording material charging member) or the like for charging the recording material S may be provided.

Figure 10:
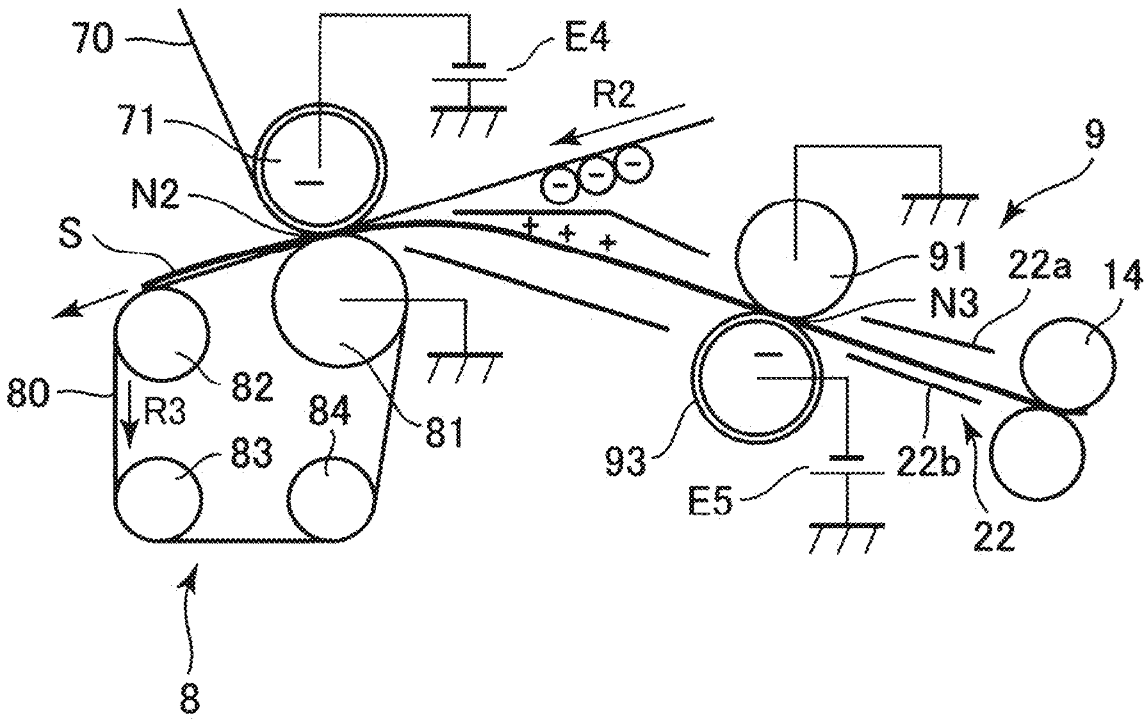
FIG. 10 is a schematic sectional view showing another example of a structure of a neighborhood of a secondary transfer portion.

Further, in the above-described embodiments, the image forming apparatus 100 included the secondary transfer unit 8 provided with the secondary transfer belt 80, but the present invention is not limited to such a constitution. For example, as shown in FIG. 9, the image forming apparatus 100 may include the outer secondary transfer roller 81 directly contacting the outer peripheral surface of the intermediary transfer belt 70. In this case, the outer secondary transfer roller 81 is pressed toward the inner secondary transfer roller 71 and is contacted to the inner secondary transfer roller 71 through the intermediary transfer belt 70, thus forming the secondary transfer portion N2 which is the contact portion between the intermediary transfer belt 70 and the outer secondary transfer roller 81. Further, for example, as shown in FIG. 10, in the case where a secondary transfer unit 8 provided with a secondary transfer belt 80 is provided, a constitution in which a surface of the secondary transfer belt 80 on which the recording material S is carried is not formed on a side upstream of the secondary transfer portion N2 with respect to the conveying direction of the recording material S may be employed.

Further, in the above-described embodiments, the image forming apparatus 100 employed an inner energization type as an energization type of the secondary transfer bias, but the image forming apparatus 100 may also employ an outer energization type as the energization type of the secondary transfer bias. That is, for example, the inner secondary transfer roller 71 in the above-described embodiments is electrically grounded, and to the outer secondary transfer roller 81 in the above-described embodiments, the secondary transfer bias of the opposite polarity to the normal charge polarity of the toner may be applied.

Further, in the above-described embodiments, each of the recording material charging member (pre-charging member) and the opposite member (pre-charging opposite member) may also be the roller-shaped member, a brush-shaped member, a sheet-shaped member, a pod-shaped member, or the like independently of each other.

Further, in the above-described embodiments, the image forming apparatus was the tandem image forming apparatus employing the intermediary transfer type capable of forming the full-color image. However, the image forming apparatus is not limited to the tandem image forming apparatus. The image forming apparatus may, for example, have a constitution (single drum type) in which toner images are successively transferred from a single first image bearing member onto a second image bearing member (intermediary transfer member) and then the toner images are transferred from the second image bearing member onto the recording material. Further, the image forming apparatus is not limited to the image forming apparatus capable of forming the full-color image, but may also be an image forming apparatus capable of forming only a monochromatic (white/black, monocolor)

image. In this case, for example, the present invention is applied to a transfer portion which is a contact portion between the image bearing member (photosensitive drum or the like) and a transfer member (transfer roller or the like) to which a transfer bias is applied. Further, the image forming apparatus may be image forming apparatuses for various purposes, such as printers, various printing machines, copying machines, facsimile machines, and multi-function machines.

According to the present invention, depending on the recording material used in the image formation, it becomes possible to charge the toner image transfer surface of the recording material to the opposite polarity to the normal charge polarity of the toner appropriately before the recording material reaches the transfer portion.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-044264 filed on Mar. 19, 2024, which is hereby incorporated by reference herein in its entirety.

What is claimed is:

1. An image forming apparatus comprising:

- an image bearing member configured to bear a toner image;
- a transfer member configured to transfer the toner image from the image bearing member onto a recording material in a transfer portion;
- a first applying portion configured to apply a transfer bias to the transfer member;
- a recording material charging member, provided upstream of the transfer portion with respect to a recording material conveying direction, configured to electrically charge a toner image transfer surface, which is a surface of the recording material conveyed toward the transfer portion where the toner image is transferred onto the surface, to an opposite polarity to a normal charge polarity of toner;
- a second applying portion configured to apply a recording material charging bias to the recording material charging member;
- a detecting portion configured to detect a current flowing through the transfer member or a voltage applied to the transfer member; and
- a controller configured to control the recording material charging bias on the basis of a detection result by the detecting portion when a charging region of the recording material charged by the recording material charging member passes through the transfer portion.

2. An image forming apparatus according to claim 1, wherein during execution of a job which is a series of operations in which an image is formed and output on a single recording material or images are formed and output on a plurality of recording materials, the controller carries out control in which a setting of the recording material charging bias is changed on the basis of the detection result by the detecting portion when the recording material passes through the transfer portion.

3. An image forming apparatus according to claim 1, wherein the controller carries out control in which a setting of the recording material charging bias is not changed in a case where an absolute value of a current detected by the detecting portion is a first value and in which the setting of the recording material charging bias is changed so that the absolute value of the recording material charging bias is made high in a case where the absolute value of the current detected by the detecting portion is a second value lower than the first value.

4. An image forming apparatus according to claim 1, wherein the controller carries out control in which a setting of the recording material charging bias is not changed in a case where an absolute value of a current detected by the detecting portion is a first value and in which the setting of the recording material charging bias is changed so that the absolute value of the recording material charging bias is made low in a case where the absolute value of the current detected by the detecting portion is a second value higher than the first value.

5. An image forming apparatus according to claim 3, wherein during detection of the current by the detecting portion, a bias subjected to constant-voltage control is applied to the transfer portion by the first applying portion.

6. An image forming apparatus according to claim 1, wherein the controller carries out control in which a setting of the recording material charging bias is not changed in a case where an absolute value of a voltage detected by the detecting portion is a first value and in which the setting of the recording material charging bias is changed so that the absolute value of the recording material charging bias is made high in a case where the absolute value of the voltage detected by the detecting portion is a second value higher than the first value.

7. An image forming apparatus according to claim 1, wherein the controller carries out control in which a setting of the recording material charging bias is not changed in a case where an absolute value of a voltage detected by the detecting portion is a first value and in which the setting of the recording material charging bias is changed so that the absolute value of the recording material charging bias is made low in a case where the absolute value of the voltage detected by the detecting portion is a second value lower than the first value.

8. An image forming apparatus according to claim 6, wherein during detection of the voltage by the detecting portion, a bias subjected to constant-current control is applied to the transfer portion by the first applying portion.

9. An image forming apparatus according to claim 1, wherein the image bearing member is an intermediary transfer member onto which the toner image is transferred from another image bearing member.

10. An image forming apparatus according to claim 1, wherein during execution of a job which is a series of operations in which images are formed and output on a plurality of recording materials, on the basis of the detection result by the detecting portion when a first recording material passes through the transfer portion, the controller carries out control in which the recording material charging bias during passing of the first recording material through the transfer portion is not changed and in which a setting of the recording material charging bias when a second recording material subsequent to the first recording material passes through the recording material charging member is changed.

* * * * *